US008995099B2

(12) United States Patent
Tracey et al.

(10) Patent No.: US 8,995,099 B2
(45) Date of Patent: Mar. 31, 2015

(54) CONTROL SYSTEM FOR ELECTRICAL CORD REEL

(75) Inventors: James B. A. Tracey, Austin, TX (US); Mark Rosenau, West Lake Hills, TX (US); Joseph M. Hill, III, Austin, TX (US); Johnathan R. Tracey, Austin, TX (US)

(73) Assignee: Great Stuff, Inc., Austin, TX (US)

( * ) Notice: Subject to any disclaimer, the term of this patent is extended or adjusted under 35 U.S.C. 154(b) by 177 days.

(21) Appl. No.: 13/566,715

(22) Filed: Aug. 3, 2012

(65) Prior Publication Data
US 2013/0032654 A1 Feb. 7, 2013

Related U.S. Application Data

(60) Provisional application No. 61/515,727, filed on Aug. 5, 2011, provisional application No. 61/582,788, filed on Jan. 3, 2012.

(51) Int. Cl.
*H05H 3/00* (2006.01)
*H02G 11/02* (2006.01)
*B65H 75/44* (2006.01)

(52) U.S. Cl.
CPC ............ *H02G 11/02* (2013.01); *B65H 75/4463* (2013.01); *B65H 75/4471* (2013.01); *B65H 2701/34* (2013.01)
USPC ............................................. 361/42; 324/511

(58) Field of Classification Search
USPC .............................................. 361/42; 324/511
See application file for complete search history.

(56) References Cited

U.S. PATENT DOCUMENTS

| 4,052,751 A | 10/1977 | Shepard |
| 4,058,735 A | 11/1977 | Tippner |
| 4,131,805 A | 12/1978 | Austin et al. |
| 4,153,923 A | 5/1979 | Graf |
| 4,384,688 A | 5/1983 | Smith |
| 4,403,143 A | 9/1983 | Walker et al. |

(Continued)

FOREIGN PATENT DOCUMENTS

WO  WO 2013/022791  2/2013

OTHER PUBLICATIONS

International Preliminary Report on Patentability for PCT application No. PCT/US2012/049628, dated Feb. 11, 2014.

(Continued)

*Primary Examiner* — Sang Kim
(74) *Attorney, Agent, or Firm* — Knobbe Martens Olson & Bear LLP

(57) ABSTRACT

In an electrical cord reel, a rotatable member can rotate about a winding axis to spool and unspool a linear material. An input power connector can couple to an electrical power source. An output power connector on the rotatable member can couple to an electrical cord at least partially wound about the rotatable member. A switch is adjustable to allow or prevent electrical current flow from the input power connector to the output power connector. In an aspect, the electrical cord reel includes an electric cord comprising a first power wire, a second power wire, and a signal wire. A method of controlling the electric cord spool system includes energizing the first power wire and the signal wire. The method further includes determining a continuity of the signal wire. The method further includes de-energizing the first power wire when determining discontinuity of the signal wire.

21 Claims, 15 Drawing Sheets

(56) References Cited

U.S. PATENT DOCUMENTS

| | | |
|---|---|---|
| 4,713,497 A | 12/1987 | Smith |
| 5,428,471 A | 6/1995 | McDermott |
| 5,600,306 A | 2/1997 | Ichikawa et al. |
| 5,781,015 A | 7/1998 | Duffin et al. |
| 6,068,490 A | 5/2000 | Salzberg |
| 6,165,010 A | 12/2000 | Prazoff |
| 6,191,697 B1 | 2/2001 | Hansen et al. |
| 6,230,109 B1 | 5/2001 | Miskimins et al. |
| 6,276,502 B1 | 8/2001 | Leyba et al. |
| 6,323,652 B1 | 11/2001 | Collier et al. |
| 6,437,957 B1 | 8/2002 | Karuppana et al. |
| 6,854,989 B2 | 2/2005 | Milan |
| 7,136,266 B2 * | 11/2006 | Gershen et al. ............ 361/42 |
| 7,320,843 B2 | 1/2008 | Harrington |
| 7,350,736 B2 | 4/2008 | Caamano et al. |
| 7,419,038 B2 | 9/2008 | Caamano et al. |
| 7,422,463 B2 | 9/2008 | Kuo |
| 7,503,338 B2 | 3/2009 | Harrington et al. |
| 7,510,426 B2 | 3/2009 | Hwang et al. |
| 7,533,843 B2 | 5/2009 | Caamano et al. |
| D599,290 S | 9/2009 | Lee |
| 7,607,603 B1 | 10/2009 | Chang |
| 7,657,499 B2 | 2/2010 | Newman et al. |
| 7,692,904 B2 | 4/2010 | Li et al. |
| D617,272 S | 6/2010 | The |
| 7,751,161 B2 | 7/2010 | Williams |
| 7,973,538 B2 | 7/2011 | Karam |
| 8,007,295 B2 | 8/2011 | Lin |
| D651,977 S | 1/2012 | Lee |
| 8,123,010 B2 | 2/2012 | Skowronski et al. |
| 8,201,673 B2 | 6/2012 | Caamano et al. |
| 8,302,895 B2 | 11/2012 | Inman et al. |
| D685,328 S | 7/2013 | Kirtland |
| 8,489,622 B2 | 7/2013 | Joshi |
| 8,500,492 B2 | 8/2013 | Brown et al. |
| D692,382 S | 10/2013 | Liu |
| D692,829 S | 11/2013 | Dobler |
| 2007/0255833 A1 | 11/2007 | Sharma |
| 2008/0194137 A1 | 8/2008 | Kuo |
| 2008/0223951 A1 | 9/2008 | Tracey et al. |
| 2011/0079676 A1 | 4/2011 | Skowronski et al. |
| 2011/0095120 A1 | 4/2011 | Inman et al. |
| 2011/0141634 A1 | 6/2011 | Caamano et al. |
| 2012/0049653 A1 | 3/2012 | Tracey et al. |
| 2013/0032654 A1 | 2/2013 | Tracey et al. |
| 2013/0171865 A1 | 7/2013 | Ceraldi et al. |
| 2013/0171866 A1 | 7/2013 | Tracey et al. |

OTHER PUBLICATIONS

International Search Report for Application PCT/US2012/049628, mailed Oct. 26, 2012.

Masterplug Switched 4 Socket Cable Reel, accessed on Nov. 2, 2011 at http://www.screwfix.com/p/masterplug-switched-4-socket-cable-reel-work-power-30m-13.

Master Plug Performance 2 Socket Cable Extension Reel, accessed on Nov. 2, 2011 at http://www.ck-supplies.com/index.php?catID=1233&prodID=7168.

* cited by examiner

CONTROL SYSTEM FOR ELECTRICAL CORD REEL

CLAIM FOR PRIORITY

The present application claims priority benefit under 35 U.S.C. §119(e) to U.S. Provisional Patent Application Ser. No. 61/515,727, filed Aug. 5, 2011, and to U.S. Provisional Patent Application Ser. No. 61/582,788, filed Jan. 3, 2012, the entire contents of both of which are incorporated by reference and should be considered a part of this specification.

INCORPORATION BY REFERENCE

Certain structures and mechanisms described or otherwise referenced herein are illustrated and described in the following patents: U.S. Pat. Nos. 6,279,848; 6,981,670; 7,350,736; 7,692,393; 7,688,010; 7,503,338; 7,419,038; 7,533,843; D632,548; and D626,818, all of which are hereby incorporated herein by reference in their entirety and should be considered a part of this specification. Certain structures and mechanisms described or otherwise referenced herein are illustrated and described in U.S. Patent App. Publ. No. 2008/0223951, which is hereby incorporated herein by reference in its entirety and should be considered a part of this specification. Certain structures and mechanisms described or otherwise referenced herein are illustrated and described in U.S. Provisional Patent Application Ser. No. 61/515,799 filed Aug. 5, 2011, U.S. Provisional Patent Application Ser. No. 61/477,108, filed Apr. 19, 2011, and U.S. Provisional Patent Application Ser. No. 61/378,861, filed Aug. 31, 2010, each of which are hereby incorporated herein by reference in their entirety and should be considered a part of this specification.

BACKGROUND

1. Field

The invention relates generally to reels for spooling linear material and specifically to controlling electrical cord reels.

2. Description of the Related Art

A reel typically comprises a cylindrical reel drum onto which a flexible linear material (such as cord, hose, etc.) is spooled. The drum ordinarily rotates about a central axis to wind or unwind (also referred to herein as spooling and unspooling) the linear material with respect to the cylindrical drum surface. Some reels include housings that protect the drum and spooled linear material from the environment. The housing may include an opening or aperture through which the linear material extends, so that it may be pulled from the housing and subsequently refracted back into the housing.

Some reel housings have a portion that includes the linear material aperture and is movable with respect to the remainder of the housing, thereby permitting a user to change the position from which the linear material is pulled from the reel. For example, U.S. Pat. No. 6,279,848 to Mead discloses a cylindrical reel drum that rotates about a horizontal axis and is enclosed within a spherical housing comprising upper and lower semispherical shell portions. The upper shell portion includes a guide aperture for the spooled linear material and is linked to the drum. The upper shell portion and drum together rotate about a vertical central axis with respect to the lower shell portion. This permits a user to pull the linear material out of the housing through the guide aperture, and move around the reel with the guide aperture following the radial position of the user. The upper shell portion and drum form a unit that is freely rotatable (about the vertical axis) with respect to the lower shell portion, through 360° and more.

A variety of electrical cord reels include spring return mechanisms for automatically spooling the linear material. Typically, a coil of flat spring steel stock is provided with one end secured to the reel drum and the other end secured to a spindle on which the drum rotates. For example, U.S. Pat. No. 6,273,354 to Kovacik et al. discloses such a reel. Such reels are often provided with a ratchet and pawl mechanism (or similar apparatus) for permitting the user to initiate rewinding of the reel by a slight tug on the linear material.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In one aspect, the invention provides an electric cord. The electric cord includes a hot wire including input and output terminals. The hot wire can receive a current at the input terminal and to provide the current at the output terminal. The electric cord further includes a neutral wire including input and output terminals. The neutral wire can complete a circuit in conjunction with the hot wire. The electric cord further includes a signal wire that can carry a signaling current. The electric cord further includes a switch to selectively couple the signal wire and the neutral wire.

In another aspect, the invention provides an electric cord control system. The electric cord control system includes an electric cord. The electric cord includes a first power wire, a second power wire, and a signal wire. The electric cord control system further includes a first switch to selectively connect the first power wire with a power source in a closed state. The first switch can also disconnect the first power wire from the power source in an open state. The electric cord control system further includes a controller to control the first switch and to provide a current to the signal wire. The electric cord control system further includes a first resistor electrically coupling the signal wire and the second power wire. The first resistor can allow a first current to flow from the signal wire to the second power wire. The electric cord control system further includes a continuity detector electrically coupled to the signal wire. The continuity detector can provide a continuity detection signal to the controller when the first current is flowing through the signal wire. The controller can open the first switch when it fails to receive the continuity detection signal from the continuity signal detector.

Another aspect of the present disclosure provides a method of controlling an electric cord spool system. The electric cord spool system includes an electric cord comprising a first power wire, a second power wire, and a signal wire. The method includes energizing the first power wire and the signal wire. The method further includes determining a continuity of the signal wire. The method further includes de-energizing the first power wire when determining discontinuity of the signal wire.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION

Figure 1:
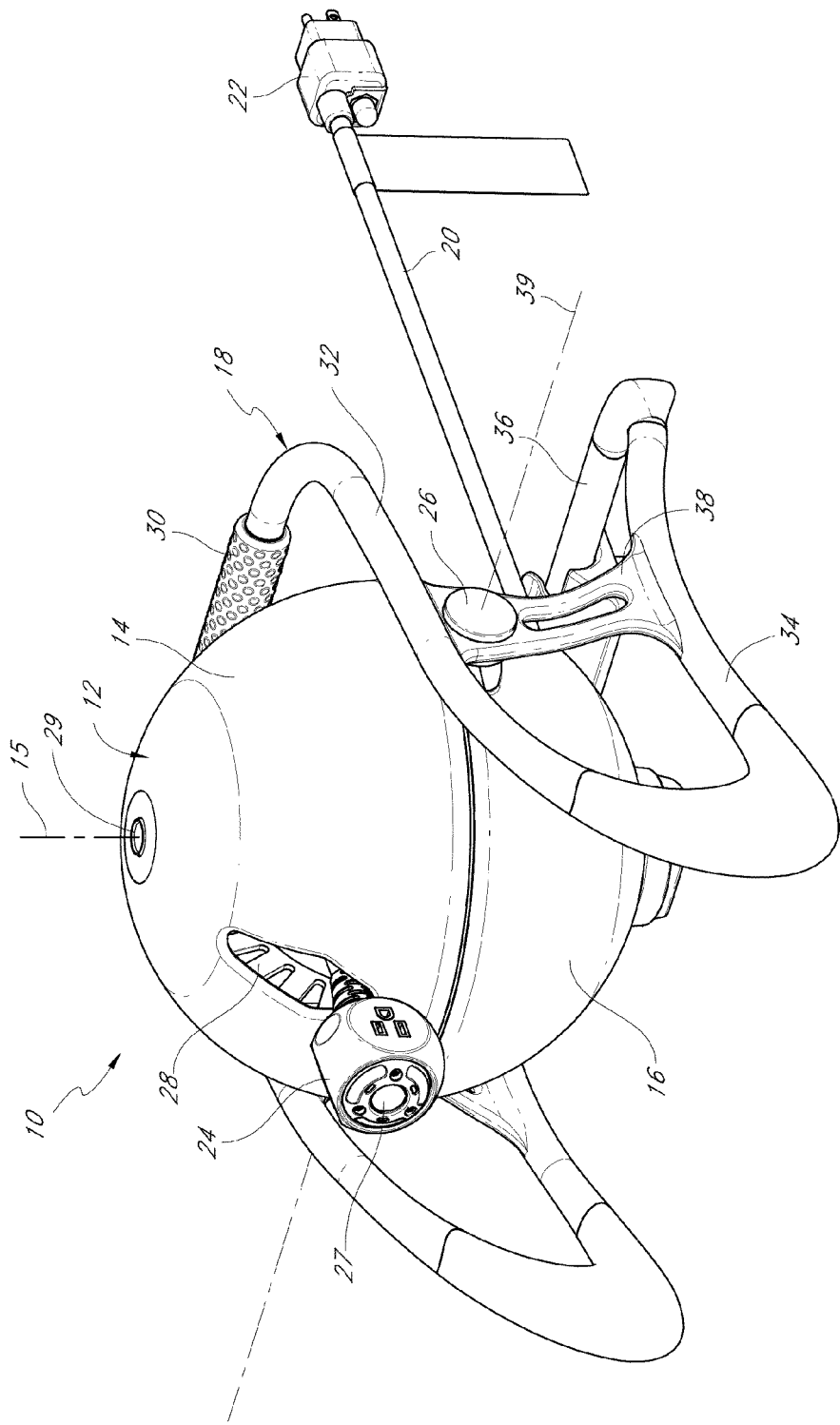
FIG. 1 is a front, right perspective view of an embodiment of an electrical cord reel.

FIG. 1 is a perspective view of an embodiment of an electrical cord reel 10. The reel 10 includes a housing 12 that substantially encloses various reel components. In the illustrated embodiment, the housing 12 is substantially spherical, but it will be understood that the housing can have other shapes. The illustrated housing 12 comprises an upper portion 14 and a lower portion 16, but it will be appreciated that the housing 12 can comprise more than two major portions. In the illustrated embodiment, each portion 14 and 16 is substantially semispherical. Preferably, the housing portions 14 and 16 are capable of rotating with respect to each other about a housing axis 15. Further details concerning such a housing 12, including structure to facilitate relative rotation between portions 14 and 16 about axis 15, are provided in U.S. Pat. No. 7,533,843 to Caamano et al.

The reel 10 preferably includes a support structure for supporting the reel with respect to a support surface, such as the ground, a tabletop, or even a wall or ceiling. A mounting element can be provided to secure the support structure with respect to a vertical wall or a ceiling. Examples of support structures and a compatible mounting element for mounting a reel to a wall, ceiling, or other surface are provided in U.S. Pat. No. 7,419,038 to Caamano et al. Also, FIG. 11 illustrates a ceiling mounting assembly.

The illustrated reel 10 has a support structure 18 comprising a rear handle portion 30, a pair of side arm portions 32, a pair of side foot portions 34, and a rear foot portion 36. The side arm portions 32 and side foot portions 34 are positioned on opposing sides of the housing 12. The rear handle portion 30 may include a grip cover (e.g., formed of rubber) to make it easier to grip the portion 30. Also, the transitions between the arm portions 32 and the foot portions 34, as well as the transitions between the side foot portions 34 and the rear foot portion 36, can be enclosed within tubular covers (e.g., rubber covers) to reduce how much the support structure 18 gets scratched and scratches other surfaces, as well as to reduce the tendency of the reel 10 to slide upon a support surface. The support structure 12 can further include connections 38 between the side arm portions 32 and the side foot portions 34, to further rigidify the support structure 12. In some embodiments, the housing 12 is rotatably mounted to the support structure 12 at a pair of connections 26 on opposing sides of the housing, so that the housing 12 can rotate at least partially with respect to the support structure 12 about a substantially horizontal axis 39 extending through connections 26.

The reel 10 can include an input electrical power cord 20 with an input power connector 22 (illustrated as a standard electrical plug) that can be mechanically and electrically coupled to an electrical power source 50 (FIG. 3), such as a standard electrical outlet. It will be appreciated that the input power connector 22 need not be provided on an input cord 20. For example, the electrical power source 50 can comprise a battery or battery pack or generator, and the input power connector 22 can comprise terminals for connection thereto. In such embodiments, the battery or battery pack may be enclosed within the housing 12. A suitable battery structure is disclosed in U.S. Pat. No. 7,320,843 to Harrington. It will be appreciated that the reel 10 can include a first input power connector for connecting to a battery, and a second input power connector 22 of an electrical cord 20.

Figure 2:
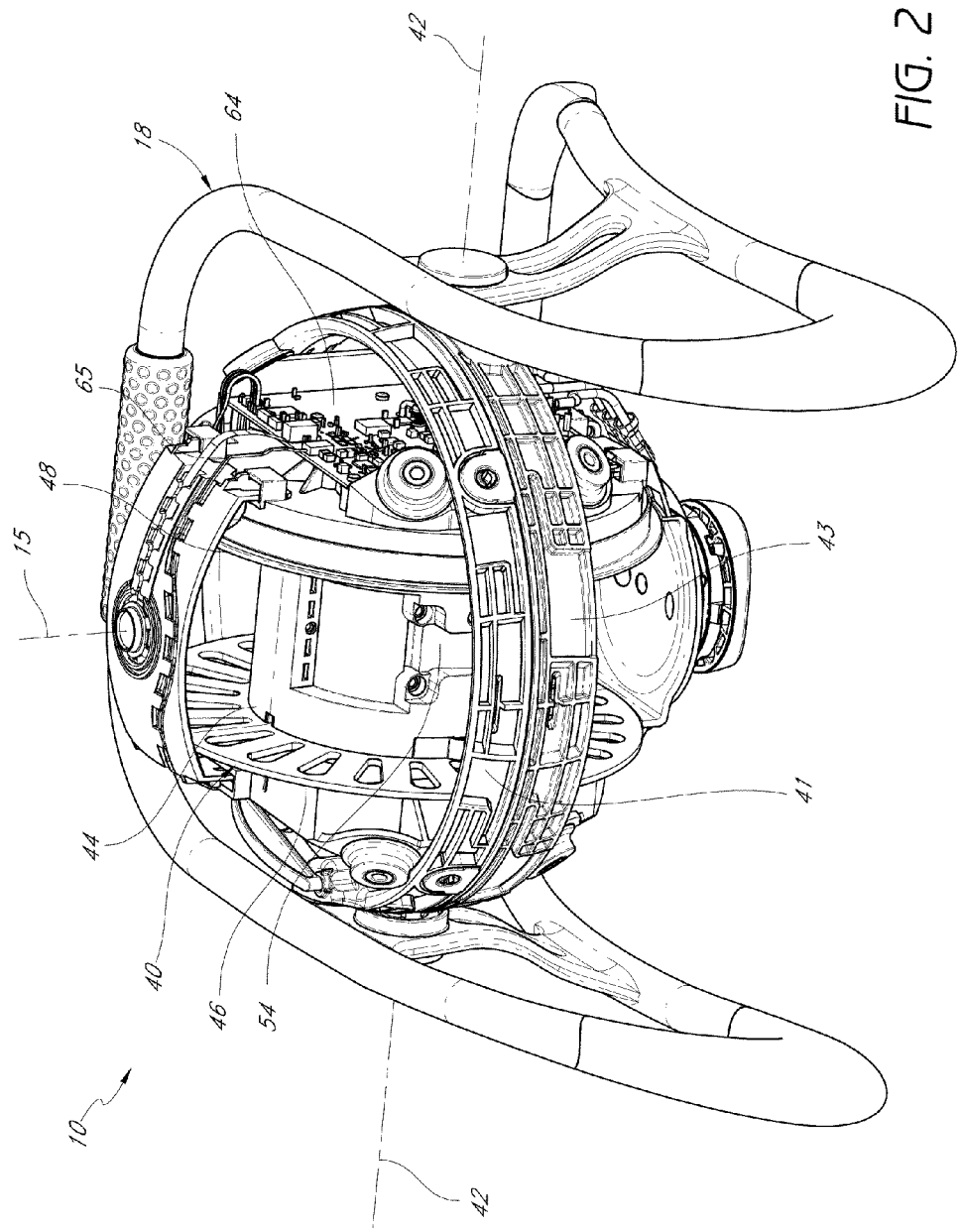
FIG. 2 is a front, right perspective view of the cord reel of FIG. 1, with the upper and lower housing portions removed to show internal components.
Figure 3:
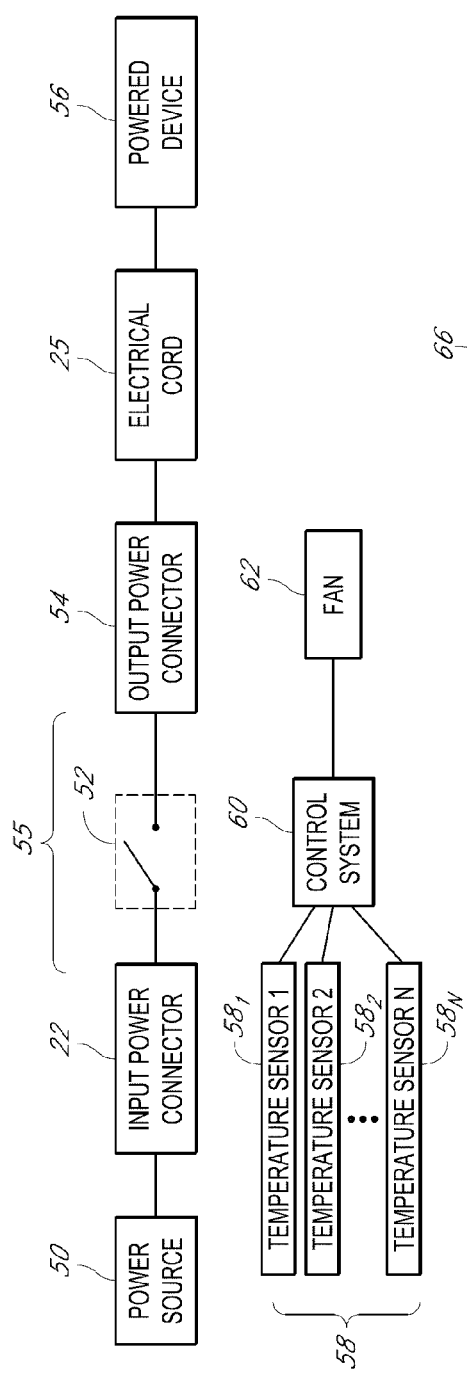
FIG. 3 is a schematic diagram illustrating electrical current flow and a temperature control system of an embodiment of a cord reel.
Figure 11:
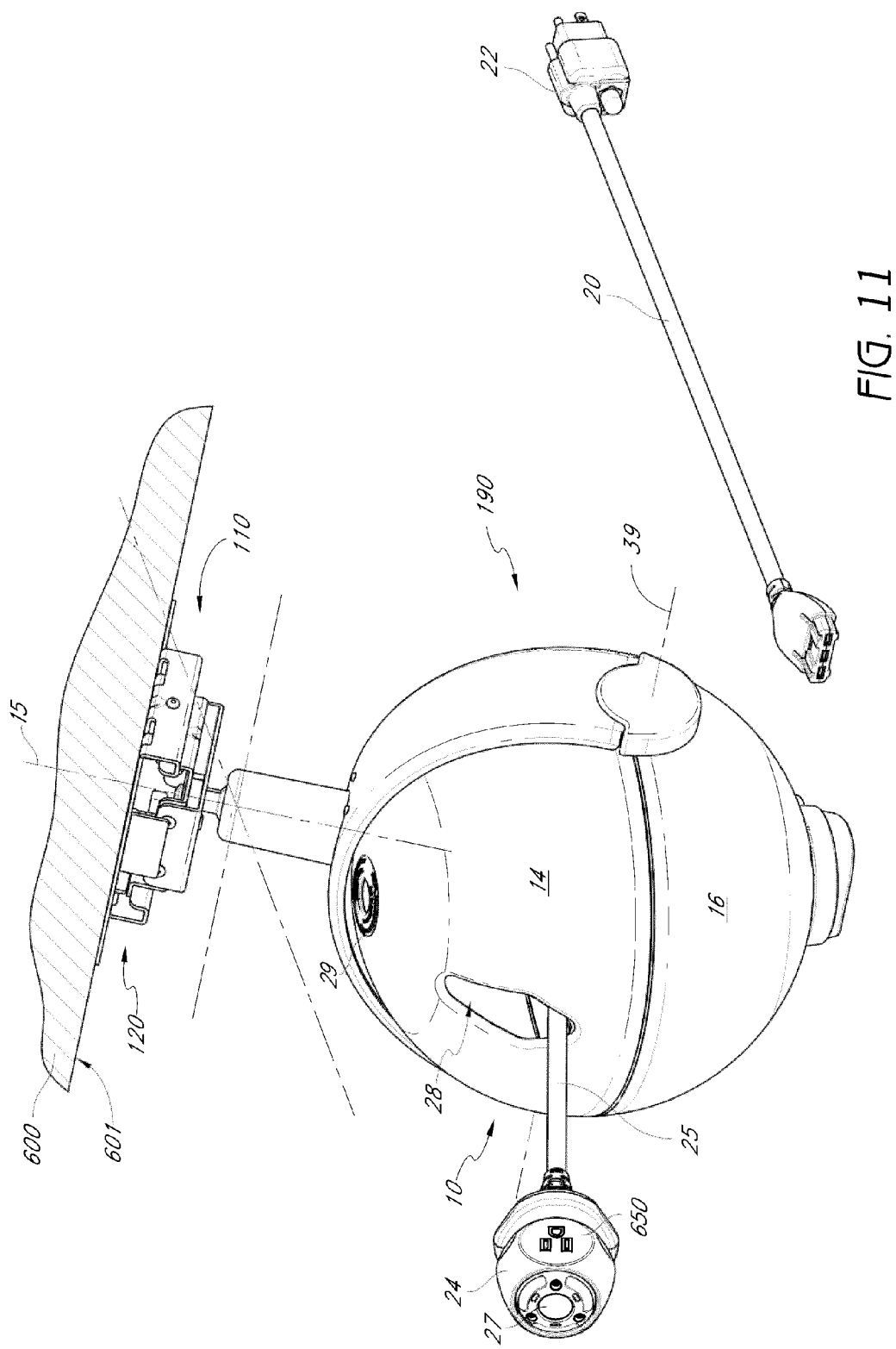
FIG. 11 is a front perspective view of a reel mounting assembly supporting a reel, according to an embodiment.

The reel 10 can spool an output electrical cord 25 (FIGS. 3 and 11). As will be described in further detail below, the reel 10 can convey electrical current from the input power connector 22 to the output cord 25. The output cord 25 can include an end portion 24 with one or more output plugs, such as a female output connector 650 (FIG. 11) for mechanically and electrically coupling to power cords of devices that will receive electrical power from the cord 25. The housing 12 preferably includes an aperture 28 through which the cord 25 may extend when partially wound about a rotatable member 40 (FIG. 2, described below) (also referred to as a "spool member") within the housing 12. In the illustrated embodiment, the aperture 28 is formed within the upper housing portion 14.

FIG. 2 shows the cord reel 10 with the upper housing portion 14 and lower housing portion 16 removed to reveal interior components. The illustrated reel 10 includes an upper circular rail 41 that attaches to the lower portion of the upper housing portion 14, and a lower circular rail 43 that attaches to the upper portion of the lower housing portion 16. The upper rail 41 and lower rail 43 (and their respective housing portions) preferably rotate with respect to one another about the housing axis 15, by employing wheels, bearings (e.g., ball bearings), or other elements to facilitate such rotation.

Figure 4:
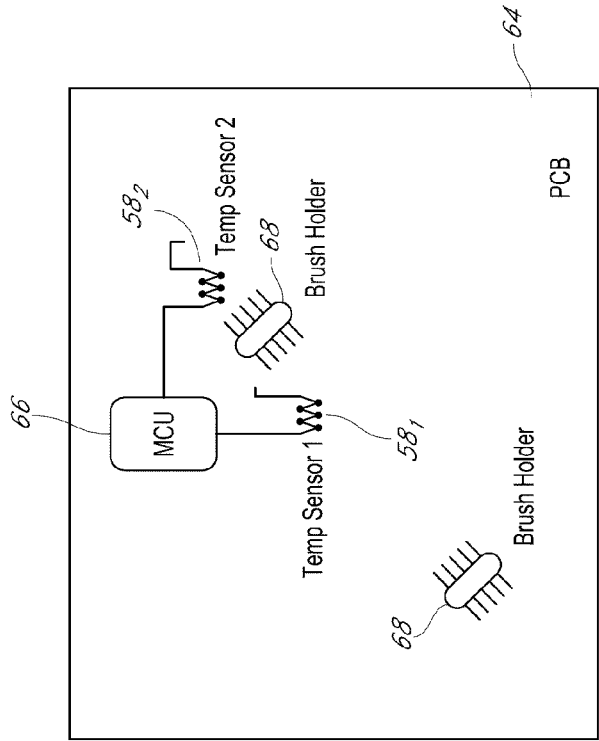
FIG. 4 is a schematic diagram of a circuit board of an embodiment of a temperature control system of a cord reel.

The housing 12 (FIG. 1) substantially encloses a rotatable member 40 can rotate about a winding axis 42 to spool and unspool an electrical cord 25 (or even other flexible linear materials, such as a hose) about the rotatable member 40. The housing 12 preferably encloses at least the rotatable member 40, the output power connector 54 (FIGS. 2 and 2A, and 3), and a fan 62 (FIGS. 3, 6, and 7), and more preferably also a motor 78 (FIG. 8) and a set of one or more temperature sensors 58 (FIGS. 3 and 4). The winding axis 42 can be but need not be collinear or parallel to the horizontal axis 39 (FIG. 1). In a preferred embodiment (described below), the rotatable member 40 and its winding axis 42 rotate about the housing axis 15 relative to the support structure 18 and lower housing portion 16. In the illustrated embodiment, the rotatable member 40 comprises a generally cylindrical drum 44 and a pair of circular plates 46 and 48 on opposite ends of the drum 44. It will be appreciated that the drum 44 need not be cylindrical.

In some embodiments, the reel 10 includes a reciprocating mechanism that causes the rotatable member 40 to rotate back and forth in a reciprocating fashion about the housing axis 15 (regardless of whether the housing portions 14 and 16 rotate with respect to one another about the axis 15) with respect to the portion of the housing 12 having the aperture 28 (in the illustrated embodiment, the upper housing portion 14). This reciprocating mechanism thereby promotes more uniform winding of the cord 25 onto the rotatable member 40. Preferably, the reciprocating mechanism only produces such reciprocating rotation of the rotatable member 40 about the axis 15 while the rotatable member 40 is rotating about the winding axis 42. An exemplary reciprocating mechanism is disclosed in U.S. Pat. No. 7,533,843 to Caamano et al.

Figure 2A:
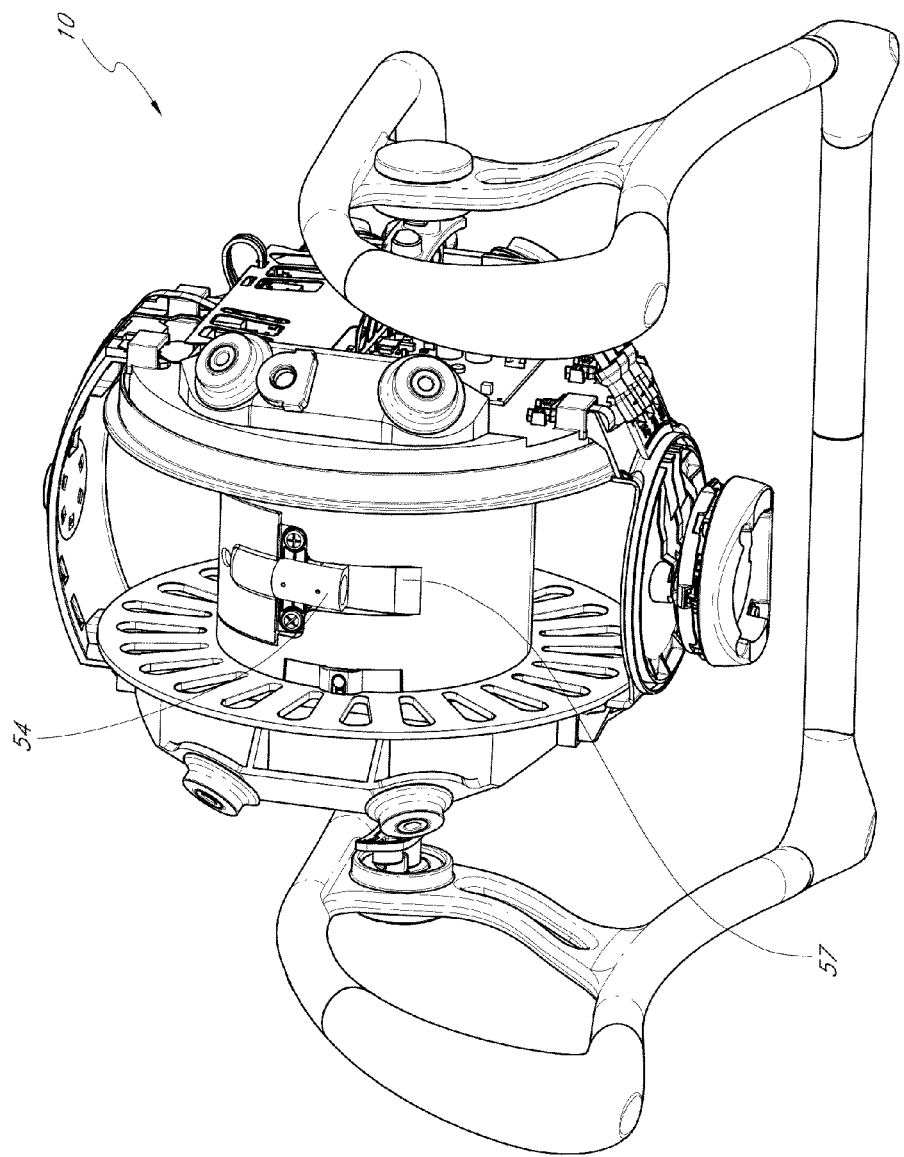
FIG. 2A is a bottom perspective view of the reel as shown in FIG. 2, with the upper and lower rails removed to show internal components more clearly.

Referring to FIGS. 2 and 2A, an output power connector 54 is preferably provided on the rotatable member 40. The output power connector 54 can be mechanically and electrically coupled to the output electrical cord 25. As will be further described below, the reel 10 can convey electrical current from the input power connector 22 (FIGS. 1 and 3) to the output power connector 54. In the figures, the bottom of the power connector 54 includes a terminal for connection with the output cord 25. Further, a recess (e.g., a sloped or ramped recess) 57 can be provided to accommodate a terminal portion of the output cord 25, so as to reduce an extent to which the connection of the cord 25 and the output power connector 54 produces a variation in the profile of the surface onto which the cord is spooled.

FIG. 3 is a schematic diagram illustrating an electrical current flow and a temperature control system of an embodiment of a cord reel 10. The input power connector 22 is connected to an electrical power source 50. As noted above, the input power connector 22 can comprise an electrical plug, and the power source 50 can comprise a municipal power grid accessible by inserting the plug into an outlet. In another embodiment, the power source 50 can comprise a portable power source (e.g., battery, generator), and the input power connector 22 can comprise electrical contacts for connecting, for example, with the battery.

The reel 10 preferably includes an electrical pathway 55 for conveying electrical current from the input power connector 22 to the output power connector 54 and an output cord 25 connected to the output connector 54. The output cord 25 can be connected to a device 56 that is to be electrically powered by the power source 50. The electrical pathway 55 can comprise, for example, one or more wires and/or one or more current pathways on a printed circuit board (e.g., the printed circuit board 64, shown in FIGS. 2, 2A, 4, 5, and 8 and described below). Preferably, the electrical pathway 55 comprises slip rings provided on one of the plates 46, 48 (FIG. 2), as well as brushes that contact the slip rings as the rotatable member 40 and plate rotate about the winding axis 42. In the illustrated embodiment, the plate 48 includes slip rings 80 (FIGS. 9 and 9A) in contact with brushes 82 (FIG. 10), as described in further detail below. It will be appreciated that part of the electrical pathway 55 can reside on or within the rotatable member 40.

The electrical pathway 55 preferably includes a switch 52 having a closed position in which electrical current flows from the input power connector 22 to the output power connector 54 through the switch 52. The switch 52 also has an open position in which the switch 52 prevents electrical current from flowing from the input power connector 22 to the output power connector 54. In a preferred embodiment, a control system 60 can control the position of switch 52.

The reel 10 (FIG. 1) can include a set of one or more temperature sensors 58 that can detect a temperature inside the housing 12 of the reel. In the illustrated embodiment, there are N temperature sensors $58_1$ through $58_N$. The reel 10 preferably also includes the control system 60 and a fan 62. The control system 60 can include, for example, a microchip 66 (FIG. 4) mounted on a printed circuit board 64, and the fan 62 can include fan blades and an electric motor that is electronically controllable by the control system 60. The control system 60 is preferably responsive to the temperature detected by the temperature sensor set 58. The control system 60 can activate the fan 62 if the temperature detected by the temperature sensor set 58 (also referred to herein as the "monitored temperature") rises from a level below a fan-activation threshold to a level above the fan-activation threshold but below a power shut-off threshold, the power shut-off threshold being greater than the fan-activation threshold. In this manner, the fan 62 helps to counteract the rising temperature inside the reel housing 12. The control system 60 can also move the switch 52 to its open position (thereby stopping any flow of electrical current to the output cord 25) if the temperature detected by the temperature sensor set 58 is greater than or equal to the power shut-off threshold. In this manner, the current flow is stopped if the temperature inside the housing 12 rises too high.

FIG. 4 is a schematic diagram of a circuit board 64 of an embodiment of a temperature control system 60. The illustrated circuit board 64 can comprise a printed circuit board as known in the art. A microchip 66 and temperature sensors $58_1$ to $58_N$ can be mounted on the circuit board 64. An example of a suitable microchip 66 is Part No. MSP430F22321DA (16-bit) from Texas Instruments Incorporated, although it will be understood that many different types of microchips can be used. The microchip 66 can operate with the internal PLL clock set at 16 MHz, for example. An example of a suitable temperature sensor 58 is an MCP9700 thermistor. In the illustrated embodiment, only two temperature sensors $58_1$ and $58_2$ are provided on the circuit board 64. The temperature sensors 58 preferably electrically communicate with the microchip 66.

As explained in further detail below with reference to FIG. 10, one or more brush holders 68 can also be mounted to the circuit board 64. The brush holders 68 hold brushes 82 that electrically contact the slip rings 80 (FIG. 9) while the rotatable element 40 is either at rest or rotating about the winding axis 42 (FIG. 2). In a preferred implementation, the temperature sensors 58 are positioned relatively close (e.g., adjacent) to the brush holders 68. In an embodiment, the temperature sensors $58_1$ and $58_2$ are flanked on opposite sides of one of the brush holders 68. This may be helpful because the brush holder locations, in some embodiments, tend to be hotter than other parts of the reel 10. In general, it is preferred to locate the temperature sensors 58 at positions that are likely to become hotter during operation, so that the cooling measures implemented by the control system 60 are more effective in preventing overheating of the reel system, which may lead to damage to system components caused by high temperature. It will be appreciated that each brush holder 68 can be flanked on two or more sides by temperature sensors 58.

Figure 5:
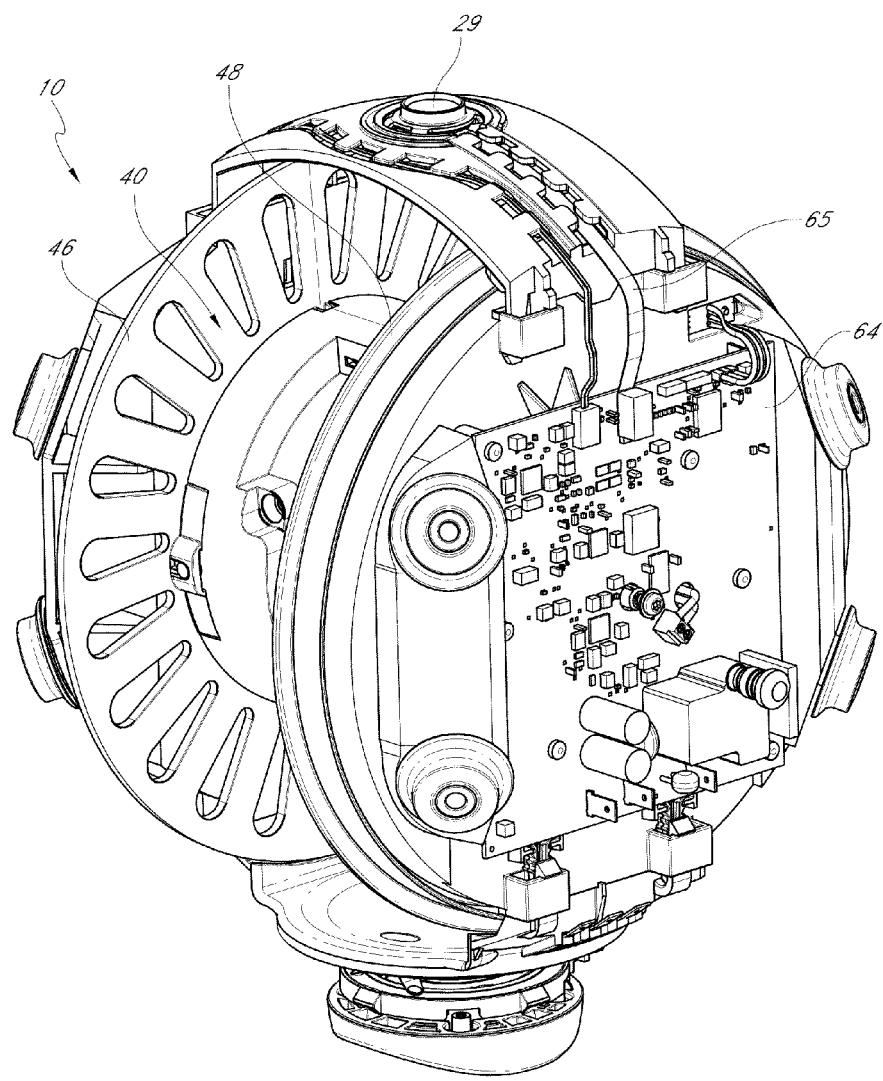
FIG. 5 is a front, right perspective view of the cord reel as shown in FIG. 2A, with the support structure removed to show internal components.
Figure 9:
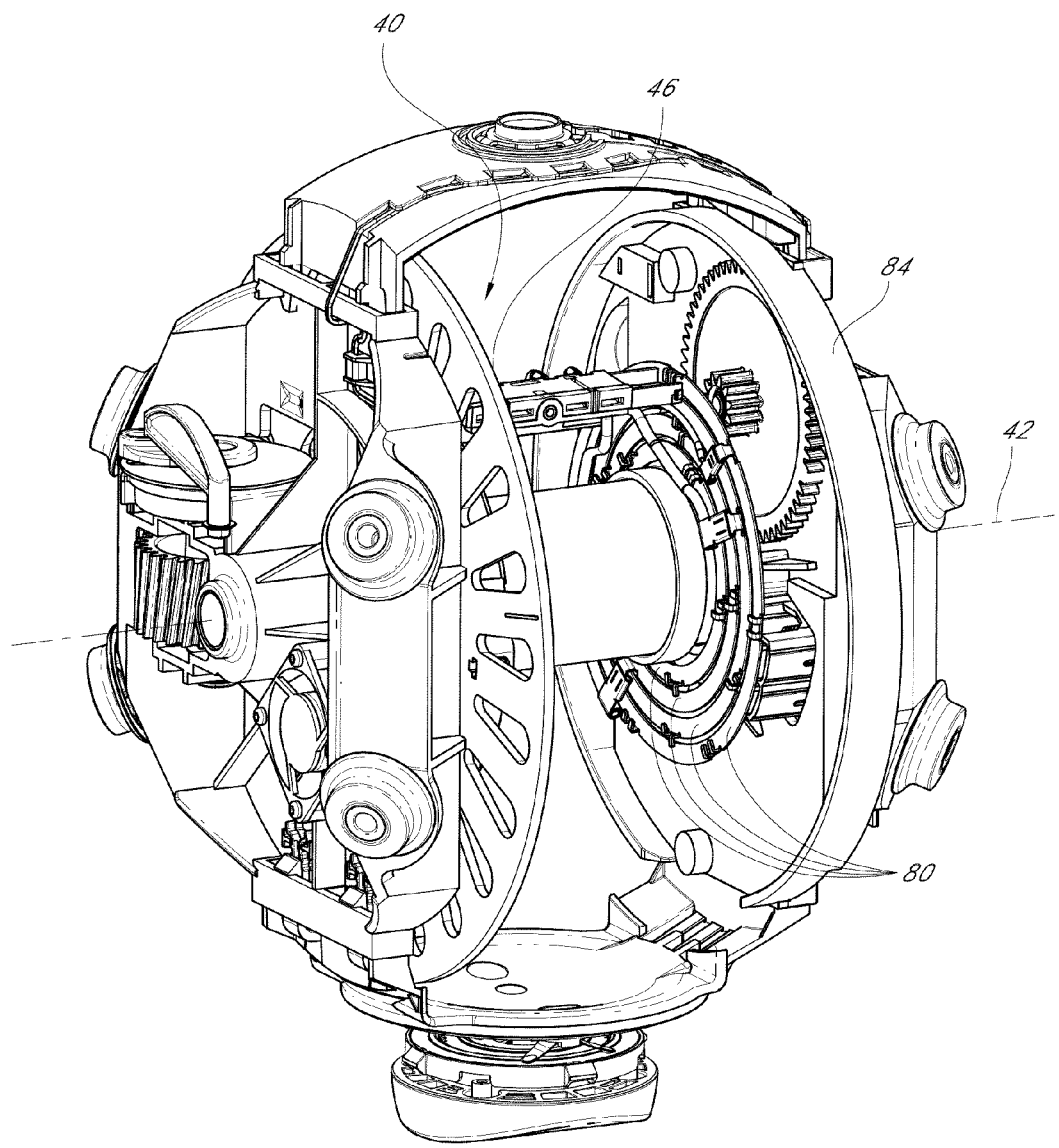
FIG. 9 is a front, left perspective view of the cord reel of FIG. 8.

FIG. 5 is a front, right perspective view of the cord reel 10 of FIGS. 1 and 2, with the support structure 18, upper housing portion 14, lower housing portion 16, upper rail 41, and lower rail 43 removed to show internal components more clearly. As shown in FIG. 5, the circuit board 64 can be mounted substantially parallel to the plate 48 of the rotatable element 40. This can facilitate electrical contact between the brushes 82 (FIG. 10) mounted to the circuit board 64 (e.g., via brush holders 68 shown in FIGS. 4 and 10) and the slip rings 80 (FIG. 9).

Figure 6:
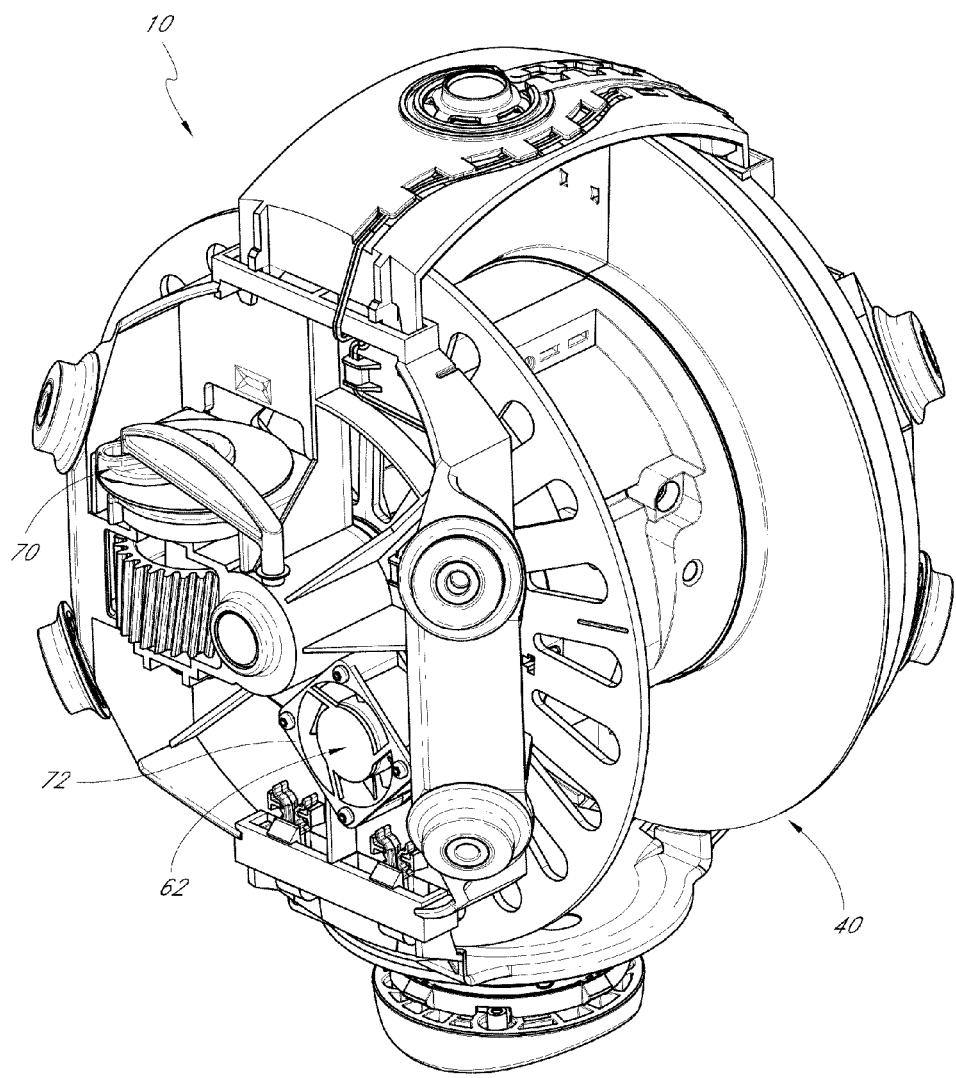
FIG. 6 is a front, left perspective view of the cord reel as shown in FIG. 5.

FIG. 6 is a front, left perspective view of the cord reel 10 of FIG. 5. In this embodiment, the fan 62 is mounted on a side of rotatable member 40 that is opposite to that of the circuit board 64. It will be understood that the fan 62 can be mounted in any of many different locations in a reel housing, but preferably where well suited to cool the more temperature-sensitive components of the reel The illustrated fan 62 includes a housing 72. FIG. 6 also shows certain components 70 of a reciprocating mechanism as described above. Further details concerning the illustrated components 70 are provided in U.S. Pat. No. 7,533,843 to Caamano et al.

Figure 7:
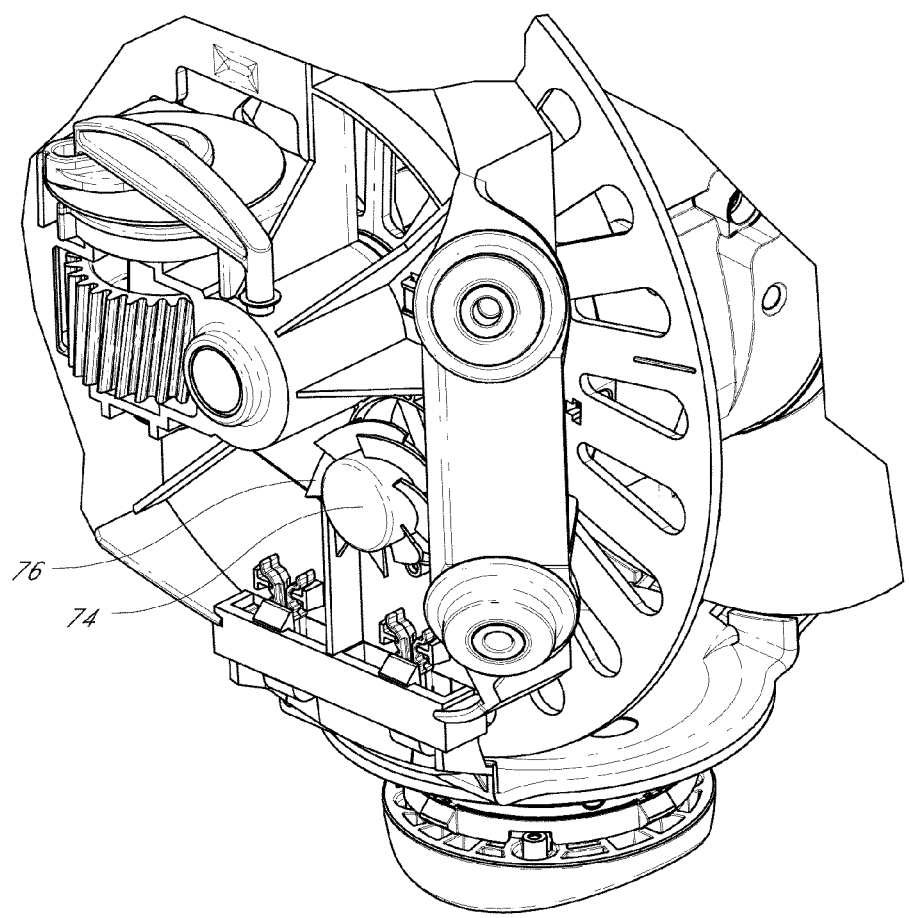
FIG. 7 is an exploded view of the cord reel as shown in FIG. 6, with the fan housing removed.

FIG. 7 is an exploded view of the cord reel 10 as shown in FIG. 6, with the fan housing 72 removed to reveal a fan hub 74 and fan blades 76.

Figure 8:
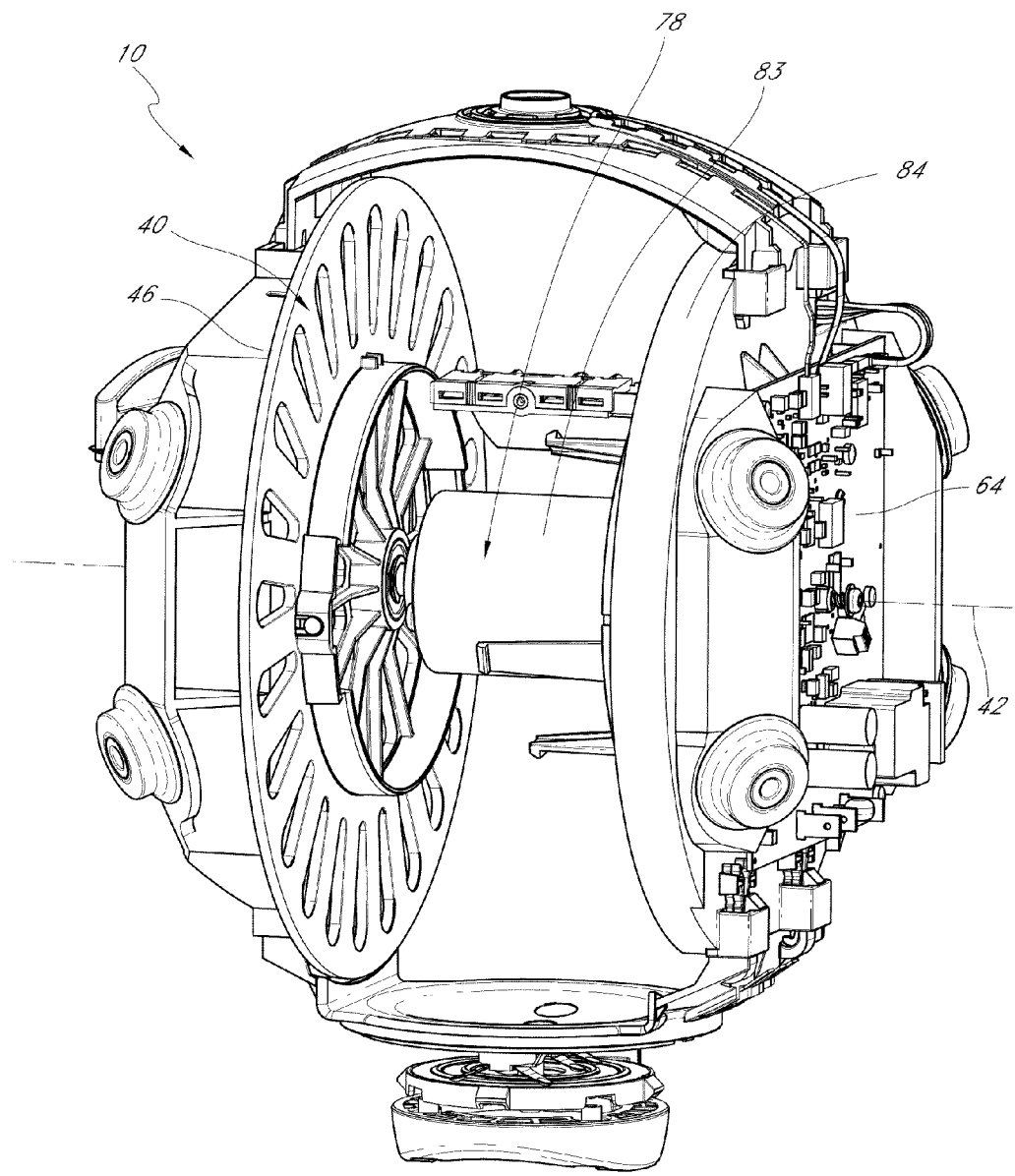
FIG. 8 is a front, right perspective view of the cord reel as shown in FIG. 5, with a portion of the rotatable member removed to show internal components.
Figure 9A:
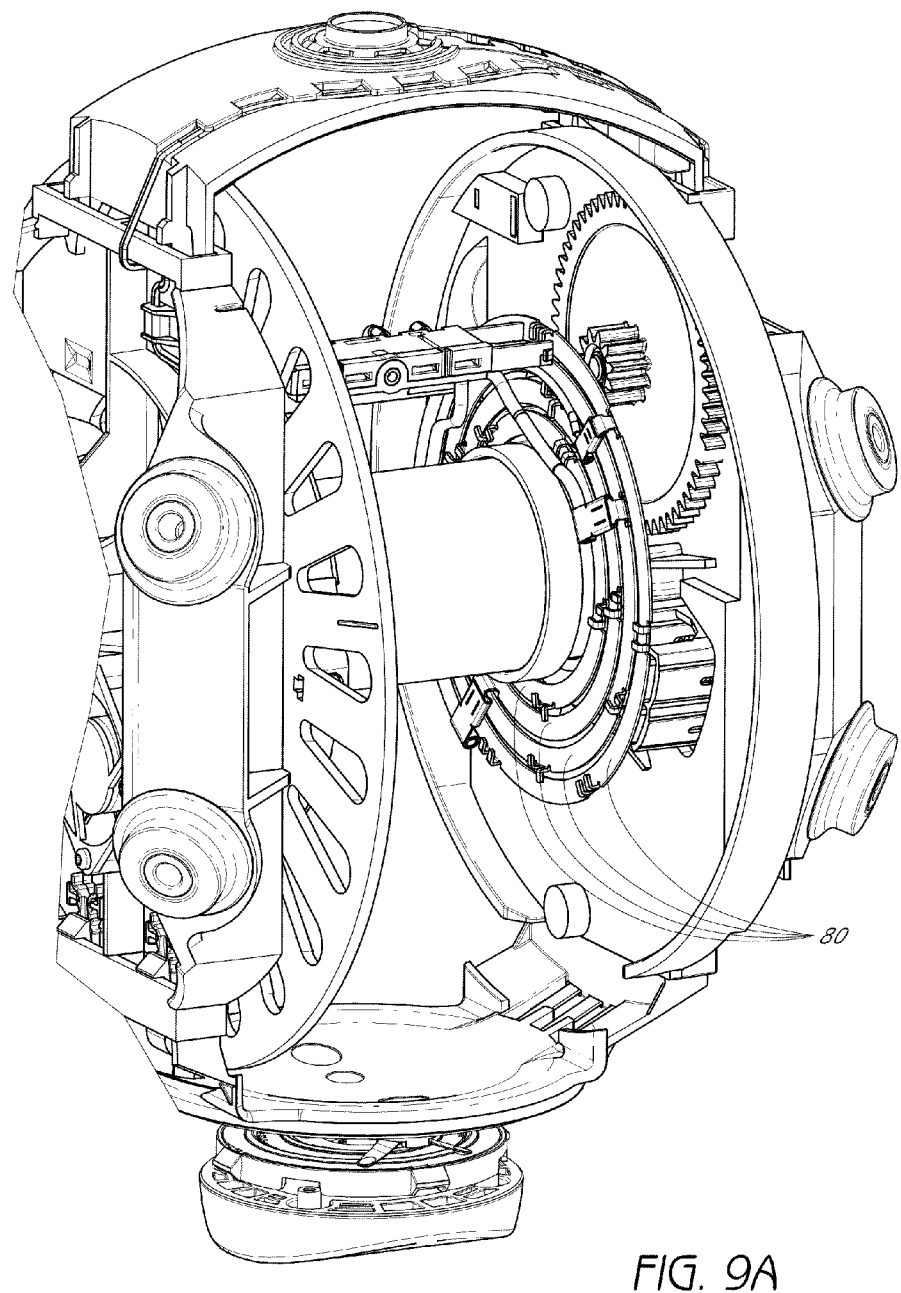
FIG. 9A is an expanded view of a portion of FIG. 9.

FIG. 8 is a front, right perspective view of the cord reel 10 as shown in FIG. 5, with the drum 44 (FIG. 2) of the rotatable member 40 removed to show internal components. In FIG. 8, the plate 48 (FIG. 2) is also removed. In the illustrated embodiment, a motor 78 is mounted within the drum 44 for powering the rotation of the rotatable member 40 about the winding axis 42. The motor 78 can include an electric motor that receives operation commands from the microchip 66 (FIG. 4) of the circuit board 64, so that the circuit board 64 controls the operation of the motor 78, and therefore the rotation of the rotatable member 40. Alternatively, the motor 78 can operate independently of the microchip 66. The motor 78 can be coupled with respect to the rotatable member 40 directly or via one or more intermediate gears (e.g., a gear reduction assembly). An embodiment of a gear assembly is provided in U.S. Pat. No. 7,533,843 to Caamano et al. The motor housing 83 can be fixed with respect to structure that is outside of one of the plates 46 and 48. For example, the housing 83 can be secured with respect to a plate 84 through an aperture within plate 48.

FIG. 9 is a front, left perspective view of the reel 10 as shown in FIG. 8. FIG. 9 shows a plurality of slip rings 80 that can be secured to the rotatable member 40. In this embodiment, the slip rings 80 (see FIGS. 9-9A) are secured to an outer surface of the plate 48 (FIG. 2) of the rotatable member 40, such that the slip rings 80 and rotatable member 40 rotate together about the winding axis 42. Preferably, the slip rings 80 electrically communicate with the output power connector 54 (FIGS. 2, 2A, and 3). In some implementations, there are three slip rings 80, one each for ground, hot, and neutral signals of an AC power supply. Further details on the use of slip rings for an electrical cord reel are provided in U.S. Pat. No. 7,419,038 to Caamano et al.

Figure 10:
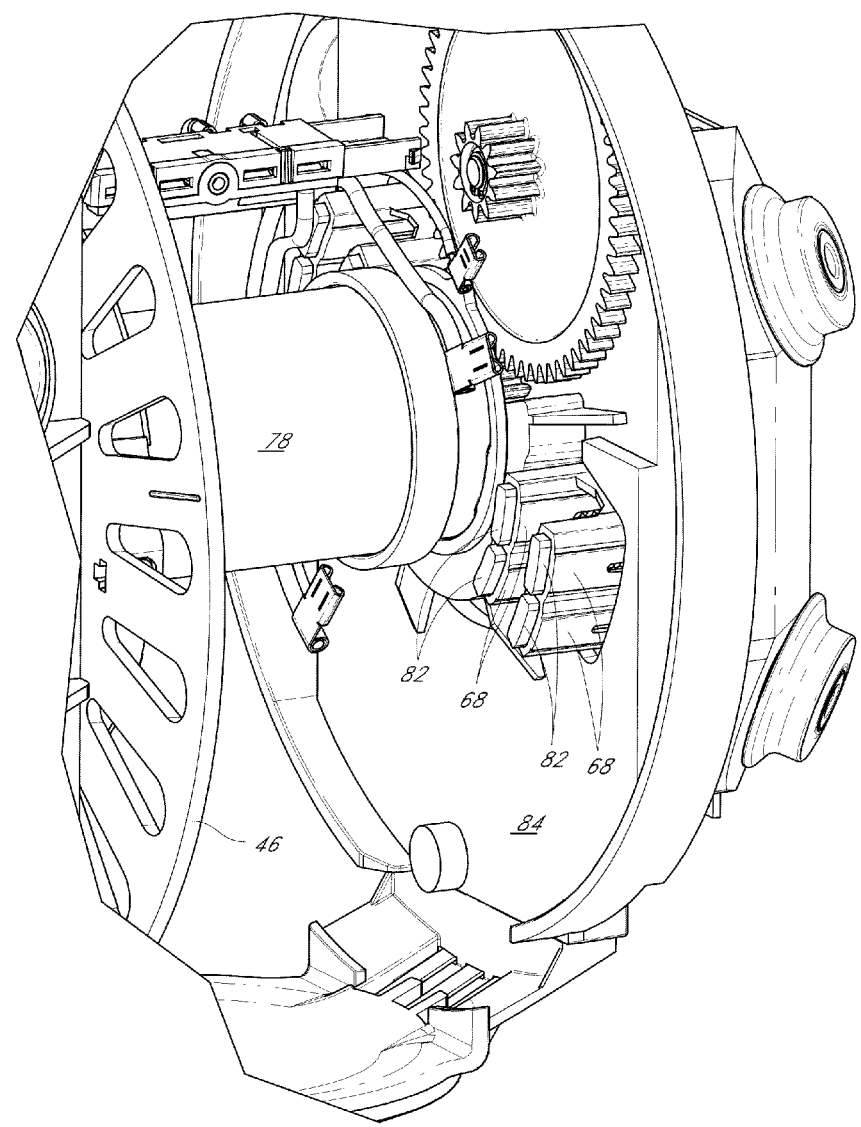
FIG. 10 is an exploded view of the cord reel as shown in FIG. 9, with the slip rings removed.

FIG. 10 is an exploded view of the cord reel 10 as shown in FIG. 9, with the slip rings 80 (FIG. 9) removed to show brushes 82 and the brush holders 68. The illustrated brush holders 68 are connected to the circuit board 64 (FIG. 5) and extend through the plate 84 of the reel 10. The brush holders 68 hold brushes 82 that form electrical connections with the slip rings 80 while the rotatable member 40 is either at rest or rotating about winding axis 42.

In certain embodiments, a remote control for controlling the motor 78 and/or switch 52 is provided. The remote control can be handheld. It can be selectively attached to and detached from the output cord 25, at the option of a user. Alternatively, the remote control can be integrated with the cord 25 in a manner that is inconsistent with repeated attachment and detachment with respect to cord 25. For example, the remote control can be integrated with the end portion 24 (FIG. 1) of the output cord 25, and can include an interface 27, such as one or more buttons for controlling the motor 78 and/or switch 52. The remote control can send control signals wirelessly or through a hardwire connection running through the cord 25. If wireless, the remote control can be paired with a wireless receiver mounted on the circuit board 64. The wireless receiver and associated electronic components can relay the wireless command signals to the motor 78 and/or switch 52. Further details concerning remote controls for operating reels are provided in U.S. Pat. No. 7,503,338 to Harrington et al. and U.S. Patent Application Publication No. 2008/0223951 to Tracey et al.

In certain embodiments, the reel 10 includes a motor controller that controls the motor 78. For example, the motor controller can activate the motor 78 in response to command signals from a remote control. In such embodiments, the motor controller can comprise components mounted on the circuit board 64. The motor controller and possibly a tension detector can detect a high-tension condition of the cord 25 (e.g., a state in which the tension exceeds a defined threshold), which may be due to a user pulling the cord 25. The motor control can respond to a detection of the high-tension condition by activating the motor 78 to unwind the cord 25. This is referred to as "powered assist." Further, the motor controller can monitor the amount of cord 25 that is unwound from the rotatable member 40. When completely rewinding the cord 25, the motor controller can reduce the rewind speed while rewinding a terminal portion of the cord 25, to prevent wild or unpredictable movements of the cord 25 and reduce the risk of damage or injury. This feature is referred to as "docking" Further details concerning a motor controller are provided in U.S. Pat. No. 7,350,736 to Caamano et al.

In certain embodiments, the reel 10 (FIG. 1) includes a user interface located on or near the housing 12 or support structure 18, for controlling the motor 78, switch 52, and/or fan 62. In the illustrated embodiment, the reel 10 includes a user interface 29 at the top of the housing 12. The illustrated user interface 29 is wired to the circuit board 64 via a connection 65 (see FIG. 5). In one implementation, the user interface 29 comprises a control (e.g., a button) that, when activated, toggles the reel 10 between a rewind state and an at-rest state. In the rewind state, the reel 10 operates the motor 78 to rewind the output cord 25. In the at-rest state, the reel 10 either does not operate the motor 78 or operates it to prevent wind or unwind rotation of the rotatable member 40. In alternative embodiments, the user interface 29 can comprise a plurality of controls for various functions of the reel.

FIG. 11 is a front perspective view of a reel mounting assembly 110 supporting a reel 10, according to an embodiment. Referring to FIG. 11, reel mounting assembly 110 can comprise a base 120 to mount to a surface 601 (e.g., a surface 601 of a ceiling, wall, bench, or other support structure 600). It will be understood that "mount to" as used herein can mean directly mounted to, or with one or more intervening structures. As shown, the end portion 24 can include a female electrical connector 650. The end portion 24 can attach to the end of the electrical cord 25. Further details concerning reel mounting assemblies are provided in U.S. Provisional Patent Application No. 61/515,799 filed Aug. 5, 2011.

Figure 12:
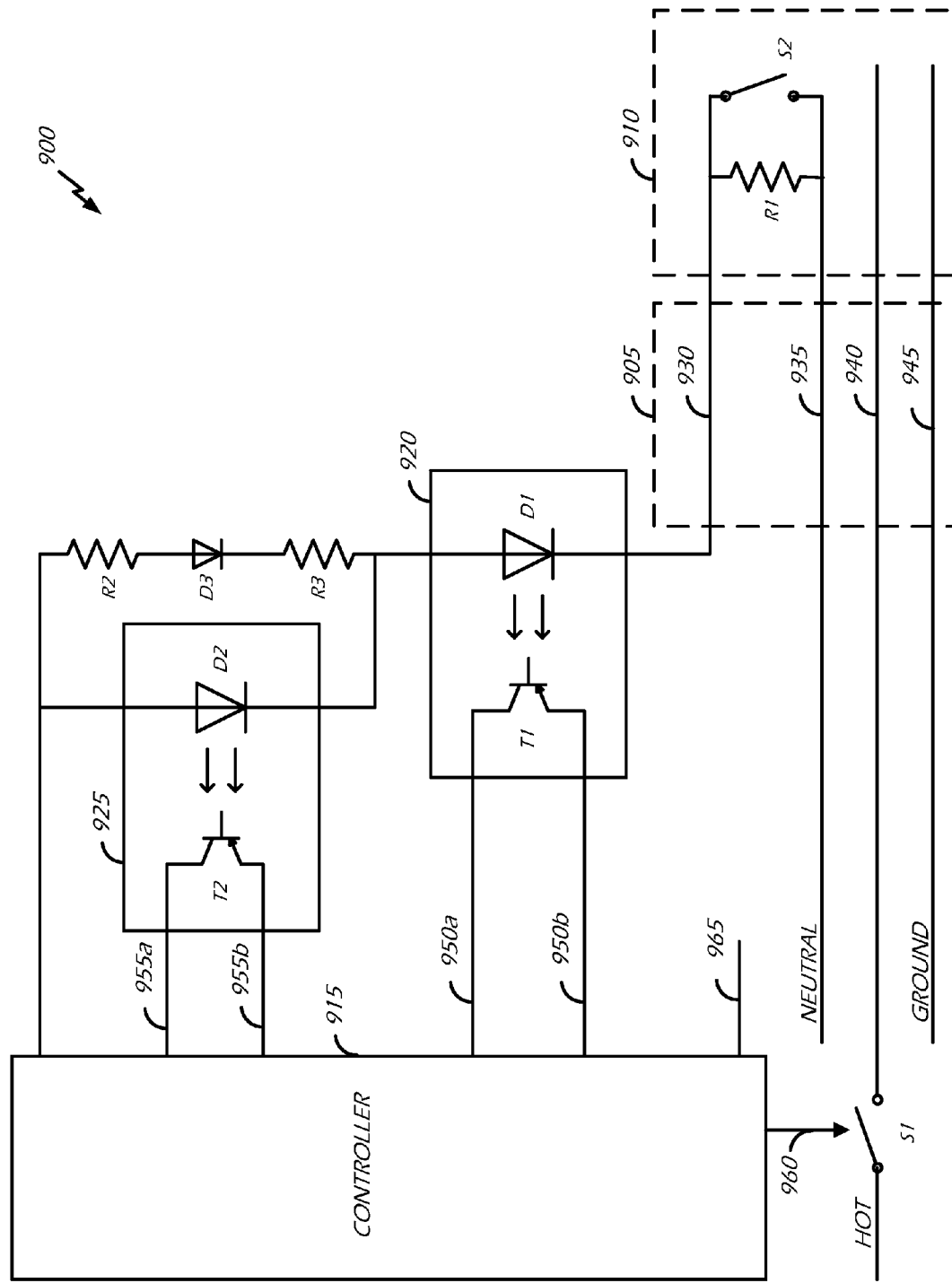
FIG. 12 is a schematic diagram illustrating a control system for an electrical cord reel, according to one embodiment.

FIG. 12 is a schematic diagram illustrating a control system 900 for an electrical cord reel, according to one embodiment. As shown, the control system 900 includes an electrical cord 905, a cord end 910, a controller 915, first and second optocouplers 920 and 925, and a power switch S1. The control system 900 can be used in conjunction with, for example, the reel 10, described above with respect to FIGS. 1-11. Particularly, the control system 900 can be used in conjunction with embodiments of the reel 10, wherein the electrical cord 25 (FIG. 11) can correspond to the electrical cord 905 and the end portion 24 can correspond to the cord end 910. In various embodiments, the control system 900 can allow a user to control one or more functions of the reel 10 from the cord end 910, and can detect damage to the electrical cord 905.

The electrical cord 905 serves to provide electric power to the cord end 910, and to convey signaling between the cord end 910 and the controller 915. In the illustrated embodiment, the electrical cord 905 includes a signal wire 930, a neutral wire 935, a hot wire 940, and a ground wire 945. The signal wire 930 serves to convey a signal from the cord end 910 to the controller 915. In an embodiment, the electrical cord 905 can be the electrical cord 25 (FIG. 11), and can be spooled on the reel 10.

The cord end 910 serves to provide access to the power wires 935, 940, and 945, and to convey signaling to the controller 915. In the illustrated embodiment, the cord end 910 includes a switch S2 a resistor R1, and the power wires 935, 940, and 945. The resistor R1 is connected in parallel with the switch S2, and serves to allow a trickle current to flow through the signal wire 930 as long as the signal wire 930 and the neutral wire 935 are intact. Accordingly, the resistor R1 can allow the controller 915 to detect continuity in the electrical cord 905, as will be described in further detail below. In an embodiment, the cord end 910 can be the end portion 24 (FIG. 1).

The switch S2 serves to signal the controller 915 from the cord end 910. When the switch S2 is open, the resistor R1 can allow the trickle current to flow. When the switch S2 is closed, the signal wire 930 and the neutral wire 920 will carry a greater current than when the switch S2 is open. In the preferred embodiment, the switch S2 is a momentary pushbutton switch. In an embodiment, the switch S2 can be accessed by a user through the interface 27 (FIG. 1). In an embodiment, the switch S2 can be controlled by a microcontroller on the end portion 24 or the interface 27, in order to convey a signal pattern to the controller 915.

Although the signal wire 930 is electrically coupled to the neutral wire 935 in the illustrated embodiment, a person having ordinary skill in the art will appreciate that other configurations are possible. In various embodiments, additional or fewer wires can be used. For example, the electrical cord 905 can carry a second signal wire (not shown), which can be coupled to the signal wire 930 instead of the neutral wire 935. In various embodiments, the signal wire 930 can be electrically coupled to the ground wire 945 or the hot wire 940.

In the illustrated embodiment, the cord end 910 provides access to the power wires 935, 940, and 945 via a standard electrical plug. In an embodiment, the cord end 910 can be the end portion 24 (FIG. 1), including the female electrical connector 650 (FIG. 11). In an embodiment, the cord end 910 can provide power to more than one electrical plug (e.g., the cord end 910 can include multiple female electrical plugs). The switch S2 can be integrated into a housing of the cord end 910. In an embodiment, the switch S2 can be separated from the cord end 910.

The first optocoupler 920 serves to detect continuity of the electrical cord 905, and to convey continuity signaling to the controller 915. The first optocoupler 920 includes a diode D1 and a phototransistor T1. In an embodiment, the diode D1 comprises a light emitting diode (LED). When a current flows through the diode D1, such as the trickle current that flows through the resistor R1, the diode D1 can emit light. The phototransistor T1 can receive the light emitted by the diode D1 and allow current to flow through continuity signal wires 950a-b, which are connected to the controller 915. Accordingly, when the trickle current flows through the resistor R1, the controller 915 can receive a continuity signal. In various embodiments, other types of isolation circuits can be used instead of the optocoupler 920, such as an isolation transformer, a capacitive isolator, a magneto-coupler, etc. In an embodiment, the isolation can be omitted, and the controller 915 can directly connect to the signal wire 930, or to either end of a resistor in series with the signal wire 930. A person having ordinary skill in the art will appreciate that any suitable means of voltage or current detection can be used.

The second optocoupler 925 serves to detect signaling from the switch S2, and to convey switch signaling to the controller 915. The second optocoupler 925 includes a diode D2 and a phototransistor T2. In an embodiment, the diode D2 comprises a light emitting diode (LED). When a current flows through the diode D2, the diode D2 can emit light. The phototransistor T2 can receive the light emitted by the diode D2 and allow current to flow through continuity signal wires 955a-b, which are connected to the controller 915.

As shown, the second optocoupler 925 is connected in parallel with a resistor R2, a diode D3, and a resistor R3. The diode D3 has a threshold voltage greater than a threshold voltage of the diode D2. When a current flowing through the signal wire 930 is relatively small, such as the trickle current, the voltage across the resistors R2 and R3 will be small. The values of the resistors R2 and R3, the threshold voltages of the diodes D2 and D3, and the trickle current can be chosen such that the trickle current will flow through the diode D3, but not through the diode D2. In other words, the trickle current will create a voltage drop across the resistors R2 and R3 that is less than the difference between the threshold voltages of the diodes D2 and D3.

When the current flowing through the signal wire 930 increases, such as when the switch S2 is closed (allowing a closed-circuit current to flow), the voltage across the resistors R2 and R3 will increase. The values of the resistors R2 and R3, the threshold voltages of the diodes D2 and D3, and the closed-circuit current can be chosen such that the closed-circuit current will flow through both the diode D3 and the diode D2. In other words, the closed-circuit current will create a voltage drop across the resistors R2 and R3 that is greater than the difference between the threshold voltages of the diodes D2 and D3.

Accordingly, when the switch S2 is open, the controller 915 can detect the state of the switch S2 through the switch signal wires 955a-b. In various embodiments, other types of isolation circuits can be used instead of the optocoupler 925, such as an isolation transformer, a capacitive isolator, a magneto-coupler, etc. In an embodiment, the isolation can be omitted, and the controller 915 can directly connect to the signal wire 930, or to either end of a resistor in series with the signal wire 930. A person having ordinary skill in the art will appreciate that any suitable means of voltage or current detection can be used.

Referring still to FIG. 12, the switch S1 serves to selectively provide power to the electrical cord 905. As shown, the switch S1 is connected on one end to a power source, which can be a common AC power source suitable for delivering power to the electrical cord 25 (FIG. 11). The switch S1 can receive a power control signal 960 from the controller 915. In various embodiments, the switch S1 can be a power transistor, a solenoid switch, etc. A person having ordinary skill in the art will appreciate that any suitable electrically controllable switch can be used.

The controller 915 serves to control the reel 10. In an embodiment, the controller 915 can form at least part of the control system 60 (FIG. 3). The controller 915 receives signaling from the cord end 910 and controls the switch S1 via the power control signal 960. The controller 915 also receives signaling from the first and second optocouplers 920 and 925, via the continuity signal wires 950a-b and the switch signal wires 955a-b, respectively. In an embodiment, the controller 915 controls spooling and unspooling of the reel 10 via a reel control signal 965. The controller 915 can control spooling and unspooling of the reel 10 in response to a signal from the cord end 910 and/or from a switch on the reel 10.

As shown, the controller 915 provides power to the signal wire 930. In various embodiments, the controller 915 provides a DC voltage and/or an AC voltage, which can be continuous or intermittent. When the switch S2 is open, the resistor R2 allows only a relatively small amount of current to flow through the signal wire 930 (i.e. a trickle current). As discussed above, the first optocoupler 920 will convey a continuity signal to the controller 915 when the trickle current flows through the signal wire 930. However, the control system 900 operates such that the trickle current is insufficient to activate the second optocoupler 925.

When the switch S2 is closed, on the other hand, a relatively large amount of current (i.e. a closed-circuit current) will flow through the signal wire 930. Accordingly, the first optocoupler 920 will still convey the continuity signal to the controller 915. Moreover, the control system 900 operates such that the closed-circuit current is sufficient to activate the second optocoupler 925. Therefore, the second optocoupler 925 will provide a switch signal to the controller 915 when the switch S2 is closed and the electrical cord 905 is intact.

If either the signal wire 930 or the neutral wire 935 is cut or damaged, however, no current will flow through the first optocoupler 920 and the controller will not receive the continuity signal. Because a damaged electrical cord 905 may be potentially dangerous, the controller 915 can open the switch S1 when it does not receive the continuity signal. Accordingly, the controller 915 will not provide power to the hot wire 925 unless it receives the continuity signal from the first optocoupler 920.

In an embodiment, the controller 915 can control the switch S1 based on the switch signal received from the second optocoupler 925. For example, the controller 915 can open or close the switch S1 when the switch S2 is closed (for example, by pressing a button). The controller 915 can detect a length of time that the switch S2 is closed (or pressed), and to perform different functions based on the length of time or a pattern in which the switch S2 is operated. In an embodiment, for example, the controller 915 can close the switch S1 when the switch S2 is closed and opened quickly. The controller 915 can open the switch S1 when the switch S2 is closed and opened slowly. The controller 915 can close or open the switch S1 when the switch S2 is momentarily pressed a number of times in succession. The controller 915 can close the switch S1 only when the switch S2 is closed and stays closed. A person having ordinary skill in the art will appreciate that the controller 915 can control the switch S1 based on any of the aforementioned signaling patterns, or other suitable signaling patterns.

In embodiment, the controller 915 can control spooling and/or unspooling of the electrical cord 905 based on the received signal from the second optocoupler 925, the state of the switch S2, the state of the switch S1, and/or the received signal pattern. For example, the controller 915 may initiate retraction of the electrical cord 905 (via the reel control signal 965) when the switch S2 is pressed. In an embodiment, the controller 915 may detect the state of the switch S1 before retracting the electrical cord 905. If the switch S1 is closed, or power is supplied to the electrical cord 905, the controller 915 may first open the switch S1, removing power from the electrical cord 905. The controller 915 may refrain from retracting the electrical cord 905 while power is supplied to the electrical cord 905 via the switch S1. In an embodiment, the controller 915 may detect a current flowing through one or more of the power wires 935, 940, and 945, and may refrain from retracting the electrical cord 905 when the detected current is above a threshold level. The controller 915 can then retract the electrical cord 905 immediately, after a delay, or after the switch S2 is pressed a second time. If the controller 915 does not detect that power is supplied to the electrical cord 905, the controller 915 may retract the electrical cord 905 in response to a first press of the switch S2.

In an embodiment, the controller 915 can set a docking length (which is described in Provisional Application 61/477, 108, incorporated herein by reference in its entirety) based on the received signal from the second optocoupler 925, the state of the switch S2, the state of the switch S1, and/or the received signal pattern. For example, the controller 915 can record the unspooled length of the electrical cord 905 when the switch signal is received from the second optocoupler 925. The controller 915 can thereafter use the recorded unspooled length of the electrical cord 905 as the docking length. In an embodiment, the controller 915 can set the docking length when the switch S2 is pressed for an extended period of time. For example, the controller 915 can set the docking length when the switch S2 is pressed and held for about 10 seconds or more.

In an embodiment, the optocoupler 920 can directly control power supplied to the electrical cord 905. For example, the optocoupler 920 can control the switch S1 to open when it does not detect at least the trickle current running through the signal wire 930. In an embodiment, the control system 900 can include a third switch (not shown) in series with the switch S1. The optocoupler 920 can control the second switch to open when it does not detect at least the trickle current running through the signal wire 930, and to close when it detects at least the trickle current running through the signal wire 930.

One or more components of the control system 900 can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The control system 900 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

While the preferred embodiments have been described above in the context of an electrical cord reel, skilled artisans will appreciate that many of the above-described aspects of the present invention are applicable for reels for other types of linear materials, or other types of electrical systems or components.

In certain embodiment, the control system 900 includes electronics for keeping track of the amount of cord withdrawn from the reel 10. For example, U.S. Pat. No. 7,350,736 and U.S. Provisional Patent Application No. 61/477,108 filed Apr. 19, 2011 both disclose electronics for monitoring the amount of linear material (e.g., hose, cord, etc.) withdrawn from a reel and using that information to slow down the rewind speed during the rewinding of a terminal portion of the linear material. In some instances, the electronics can lose track of the amount of withdrawn linear material. For example, during a power outage the user can manually pull more linear material out of the reel, and the electronics may not track that movement of the linear material.

To address this problem, embodiments of the control system 900 of the present application can receive a "reset" command signal (e.g., from the switch S2) and respond to the signal by fully rewinding the cord 25. Once the cord 25 is fully rewound, the control system 900 can "reset" a variable indicative of the amount of withdrawn cord 25.

Figure 13:
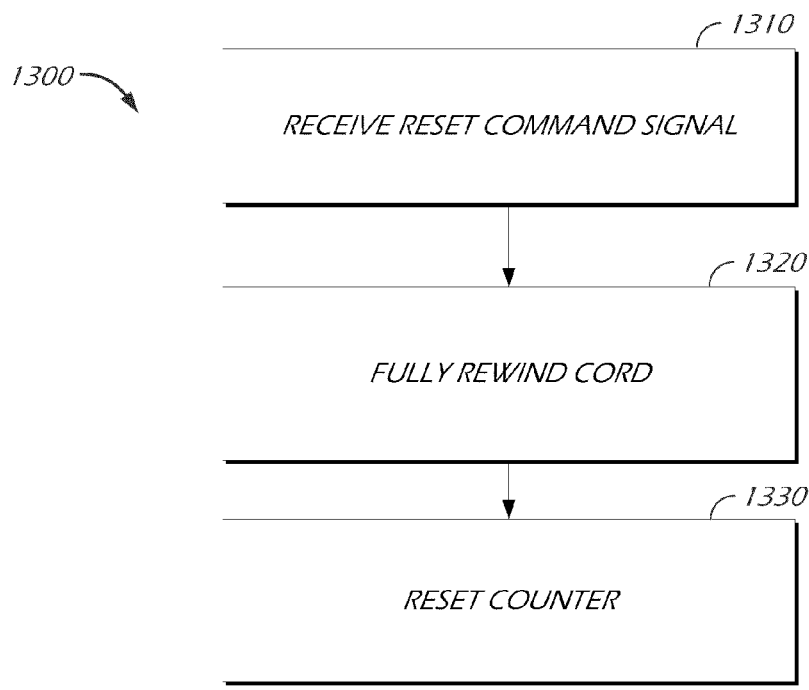
FIG. 13 is a flowchart illustrating an embodiment of a method of resetting a variable indicative of an amount of cord withdrawn from a reel.

FIG. 13 is a flowchart 1300 illustrating an embodiment of a method of resetting a variable indicative of an amount of cord withdrawn from a reel. Although the method of flowchart 1300 is described herein with reference to the reel 10 discussed above with respect to FIG. 1 and the reel control system 900 discussed above with respect to FIG. 12, a person having ordinary skill in the art will appreciate that the method of flowchart 1300 may be implemented by another device described herein, or any other suitable device. In an embodiment, the steps in flowchart 1300 may be performed by a processor or controller such as, for example, the controller 915 (FIG. 12) and/or the control system 60 (FIG. 1). Although the method of flowchart 1300 is described herein with reference to a particular order, in various embodiments, blocks herein may be performed in a different order, or omitted, and additional blocks may be added.

Prior to block 1310, an amount of the cord 25 is deployed (i.e., unspooled) from the reel 10. At block 1310, the reel 10 receives a reset command signal (e.g., from the switch S2 of cord 25) from a user. In block 1320, the reel 10 fully rewinds the cord 25. In block 1330, the control system 900 resets a variable indicative of the amount of withdrawn cord 25, such as a count of revolutions of the output shaft of the motor 78 or of the rotatable member 40 (e.g., using revolution monitors such as Hall Effect sensors and magnets sensed thereby). Resetting the variable can include, for example, setting the count to zero or any other number defined to indicate that the cord 25 is fully rewound.

In some embodiments, the reel 10 can suspend rewinding before the cord 25 is fully rewound, if the cord gets caught on an object (e.g., a user's foot, tree, car, etc.). In some such embodiments, the reel 10 monitors the electrical current drawn by the motor 78 to rewind the cord 25, and stops the motor from rewinding the cord 25 when the drawn current exceeds a threshold. This can pose problems for block 1320 of FIG. 13, since the reel 10 might interpret the suspended rewinding to mean that the cord 25 is fully rewound, when in reality the cord is partially withdrawn from the reel 10. Accordingly, in certain embodiments the control system 900 in block 1320 can reattempt rewinding one or more times after the previous rewind is suspended due to a high current draw by the motor 78. It is expected that the method 1300 will typically be conducted with a user present, so that the user can remove the cord 25 from any objects on which it gets caught, to enable the cord 25 to be fully rewound. The control system 900 can determine that the cord 25 is fully rewound after a plurality of successive attempts to rewind the cord 25 are suspended due to high current draw, or after the user provides an electronic signal to indicate that the cord is fully rewound.

The control system 900 can keep track of the amount of cord rewound in block 1320. Then, subsequent to block 1330, the control system 900 can operate the motor 78 to deploy (i.e., unspool) the cord 25 by the same length, perhaps with the assistance of a user pulling the cord 25. As a result, the cord 25 becomes unspooled to the same length that it was withdrawn prior to block 1310. During this unspooling, the control system 900 can keep track of the amount of unspooled cord 25, so that the control system 900 knows accurately how much cord is unspooled.

While the method of FIG. 13 is described above in the context of a cord reel 10 for spooling a cord 25, it will be appreciated that this method can apply to other types of reels that spool linear materials other than electrical cord (e.g., hose).

Figure 14:
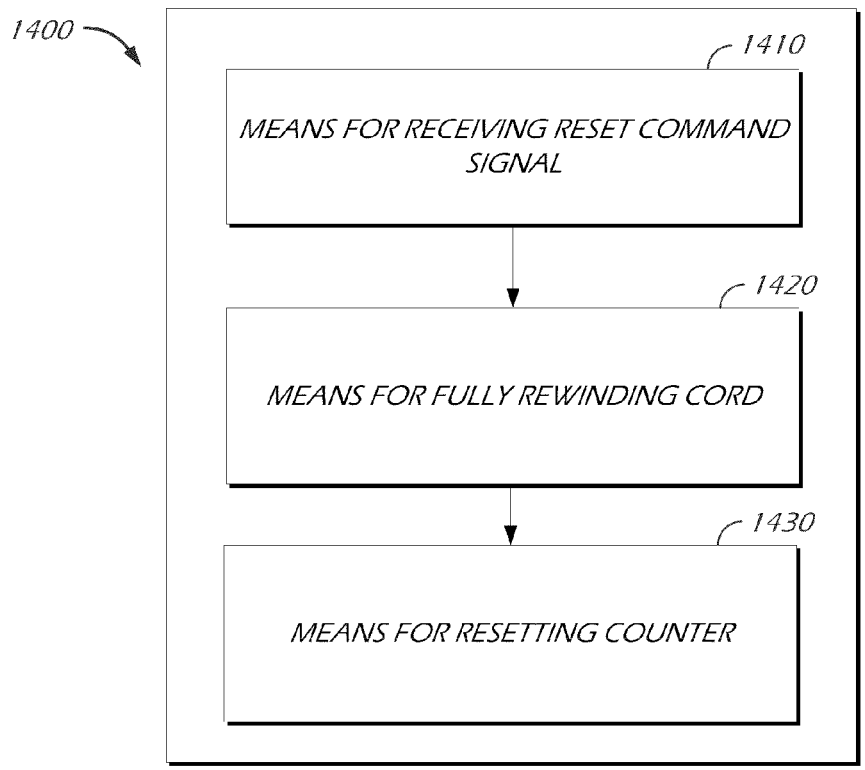
FIG. 14 is a functional block diagram of a system for resetting a variable indicative of an amount of cord withdrawn from a reel, in accordance with an exemplary embodiment of the invention.

FIG. 14 is a functional block diagram of a system 1400 for resetting a variable indicative of an amount of cord withdrawn from a reel, in accordance with an exemplary embodiment of the invention. The system 1400 for resetting a variable indicative of an amount of cord withdrawn from a reel includes means 1410 for receiving a reset command signal, means 1420 for fully rewinding a cord, and means 1430 for resetting a counter.

In an embodiment, the means 1410 for receiving a reset command signal can perform one or more of the functions described above with respect to block 1310 (FIG. 13). In various embodiments, the means 1410 for receiving a reset command signal can be implemented by one or more of the controller 915 (FIG. 12) and the control system 60 (FIG. 3), the signal wire 930 (FIG. 12), and the optocouplers 925 and 920 (FIG. 12).

The means 1420 for fully rewinding the cord can perform one or more of the functions described above with respect to block 1320. In various embodiments, the means 1420 for fully rewinding the cord can be implemented by one or more of the motor 78 (FIG. 8), the controller 915 (FIG. 12), the control system 60 (FIG. 3), the signal wire 930 (FIG. 12), and the optocouplers 925 and 920 (FIG. 12).

The means 1430 for resetting the counter can perform one or more of the functions described above with respect to block 1330. In various embodiments, the means 1430 for resetting the counter can be implemented by one or more of the controller 915 (FIG. 12) and the control system 60 (FIG. 3).

Figure 15:
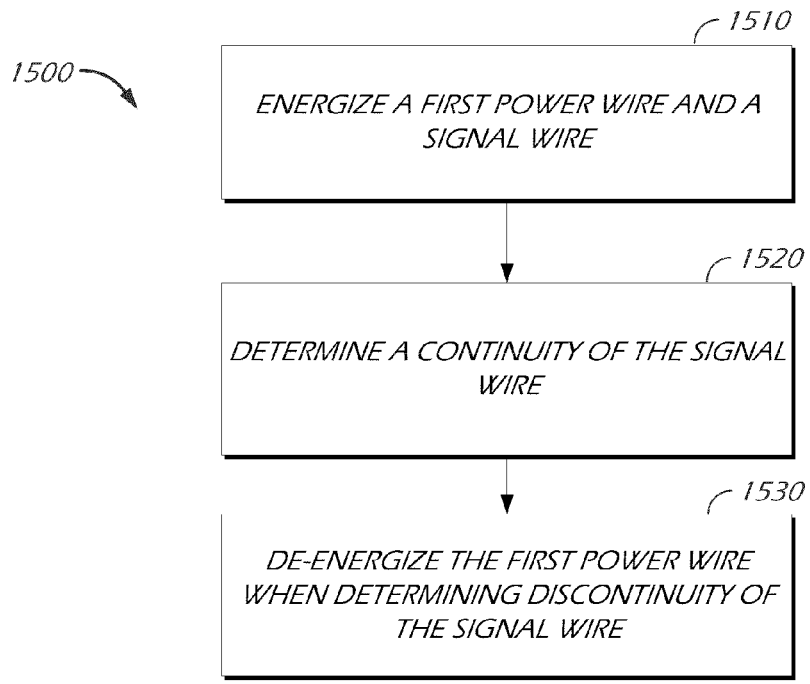
FIG. 15 is a flowchart of an exemplary method of controlling an electrical cord reel.

FIG. 15 is a flowchart 1500 of an exemplary method of controlling an electrical cord reel. Although the method of flowchart 1500 is described herein with reference to the reel 10 discussed above with respect to FIG. 1 and the reel control system 900 discussed above with respect to FIG. 12, a person having ordinary skill in the art will appreciate that the method of flowchart 1500 may be implemented by another device described herein, or any other suitable device. In an embodiment, the steps in flowchart 1500 may be performed by a processor or controller such as, for example, the controller 915 (FIG. 12) and/or the control system 60 (FIG. 1). Although the method of flowchart 1500 is described herein with reference to a particular order, in various embodiments, blocks herein may be performed in a different order, or omitted, and additional blocks may be added.

First, at block 1510, the controller 915 energizes a first power wire and a signal wire. In various embodiments, the first power wire can be the hot wire 940, and the signal wire can be the signal wire 930. The hot wire 940 can be energized, for example, by the switch S1. The signal wire 930 can be energized, for example, by the controller 915.

Next, at block 1520, the controller 915 determines a continuity of the signal wire 930. For example, the controller 915 can continuously, periodically, or intermittently monitor the output of the first optocoupler 920. When a threshold current is running through the diode D1, the controller 915 can determine that the signal wire 930 has continuity. When the threshold current is not running through the diode D1, the controller 914 can determine that the signal wire 930 is discontinuous.

Then, at block 1530, the controller 915 can de-energize the first power wire when it determines that the signal wire 930 is discontinuous. The controller 915 can de-energize the hot wire 940, for example, by opening the switch S1.

In various embodiments, the controller 915 can also detect a current running through the signal wire 930, for example, via the second optocoupler 925. For example, the opening and closing of the switch S2 can change the current running through the signal wire 930. As discussed above with respect to FIG. 12, the controller 914 can perform various actions based on the detected change in current such as, for example, spooling/unspooling the electrical cord 25, setting a docking length, performing a system reset, providing power to the outlet 650, and so on. In some embodiments, the controller 915 can perform one or more of these actions based on a pattern, duration, or measurement of the current. In other embodiments, the controller 915 can detect a different electrical parameter of the signal wire 930 such as, for example, a voltage of the signal wire 930, and perform one or more actions based on that electrical parameter.

Figure 16:
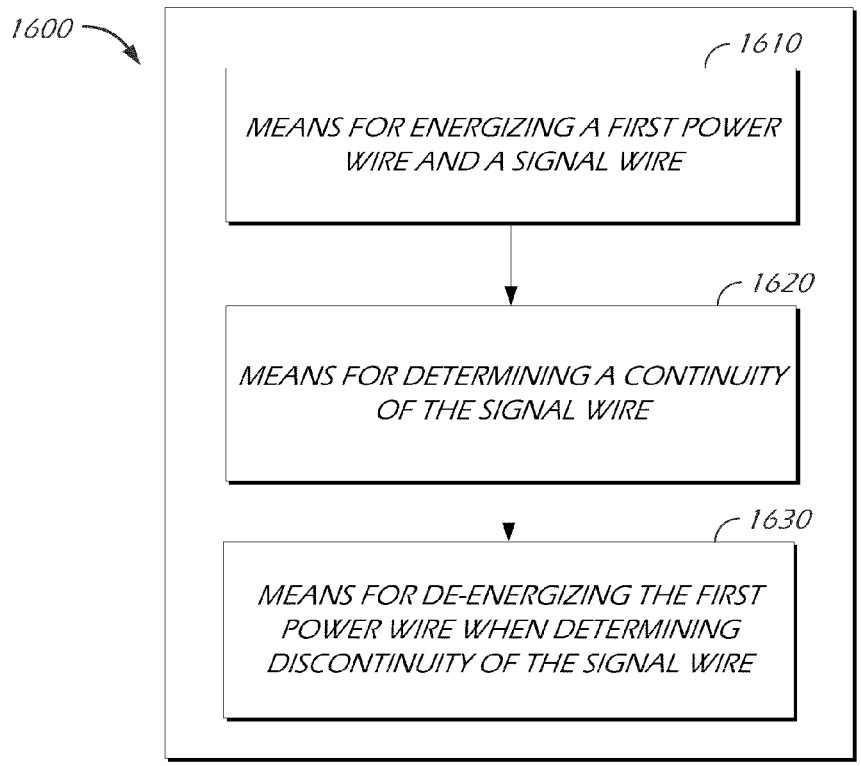
FIG. 16 is a functional block diagram of a system for controlling an electrical cord reel, in accordance with an exemplary embodiment of the invention.

FIG. 16 is a functional block diagram of a system 1600 for controlling an electrical cord reel. The system 1600 for resetting a variable indicative of an amount of cord withdrawn from a reel includes means 1610 for energizing the first power wire and the signal wire, means 1620 for determining a continuity of the signal wire, and means 1630 for de-energizing the first power wire when determining discontinuity of the signal wire.

In an embodiment, the means 1610 for energizing the first power wire and the signal wire can perform one or more of the functions described above with respect to block 1510 (FIG. 15). In various embodiments, the means 1610 for energizing the first power wire and the signal wire can be implemented by one or more of the controller 915 (FIG. 12), the control system 60 (FIG. 3), the switch S1 (FIG. 12), and the resistor R1 (FIG. 12).

The means 1620 for determining a continuity of the signal wire can perform one or more of the functions described above with respect to block 1520. In various embodiments, the means 1620 for determining a continuity of the signal wire can be implemented by one or more of the controller 915 (FIG. 12), the control system 60 (FIG. 3), the signal wire 930 (FIG. 12), and the optocouplers 925 and 920 (FIG. 12).

The means 1630 for de-energizing the first power wire when determining discontinuity of the signal wire can perform one or more of the functions described above with respect to block 1530. In various embodiments, the means 1630 for de-energizing the first power wire when determining discontinuity of the signal wire can be implemented by one or more of the controller 915 (FIG. 12), the control system 60 (FIG. 3), and the switch S1 (FIG. 12).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electric cord comprising:
a hot wire comprising input and output terminals, the hot wire configured to receive a current at the input terminal and to provide the current at the output terminal;
a neutral wire comprising input and output terminals, the neutral wire configured to complete a circuit in conjunction with the hot wire;
a signal wire configured to carry a signaling current; and
a first switch configured to selectively couple the signal wire to both the input and output terminals of the neutral wire.

2. The electric cord of claim 1, wherein the input terminal of the hot wire is configured to receive an alternating voltage at approximately 120 V RMS and approximately 60 Hz.

3. The electric cord of claim 1, further comprising an electric cord control system comprising:

a second switch configured to selectively connect the hot wire with a power source in a closed state, and to disconnect the hot wire from the power source in an open state;
a controller configured to control the second switch and to provide a current to the signal wire;
a first resistor electrically coupling the signal wire and the neutral wire, and configured to allow a first current to flow from the signal wire to the neutral wire;
a continuity detector electrically coupled to the signal wire and configured to provide a continuity detection signal to the controller when the first current is flowing through the signal wire,
wherein the controller is further configured to open the second switch when it fails to receive the continuity detection signal from the continuity signal detector.

4. The electric cord of claim 3, wherein:
the first switch is configured to selectively couple the signal wire and the neutral wire, in parallel with the first resistor, and to allow a second current to flow between the signal wire and the neutral wire; and
the electric cord control system further comprises a signaling detector electrically coupled to the signal wire and configured to provide a signaling detection signal to the controller when the second current is flowing through the signal wire.

5. The electric cord of claim 4, wherein the controller is further configured to toggle the second switch, between the open and closed state, when it receives the signaling detection signal from the signaling detector.

6. The electric cord of claim 4, further comprising:
a spool member onto which the electric cord can be spooled;
a motor configured to rotate the spool member in at least one of a spooling direction and an unspooling direction, based on a signal from the controller;
wherein the controller is further configured to:
detect the state of the second switch,
open the second switch when the switch is closed and the controller receives the signaling detection signal from the signaling detector; and
control the motor to rotate in the spooling direction when the second switch is open and the controller receives the signaling detection signal from the signaling detector.

7. The electric cord of claim 6, wherein the controller is further configured to:
detect an unspooled length of the electrical cord;
control the motor to rotate in the spooling direction at a first speed when the unspooled length is at least a threshold length and the controller receives the signaling detection signal from the signaling detector.

8. The electric cord of claim 7, wherein the controller is further configured to control the motor to rotate in the spooling direction at a second speed when the unspooled length is less than the threshold length and the controller receives the signaling detection signal from the signaling detector, the second speed being lower than the first speed.

9. The electric cord of claim 8, wherein the controller is further configured to set the unspooled length of the electrical cord, in a memory, as the threshold when the controller receives the signaling detection signal from the signaling detector in accordance with a signaling pattern.

10. The electric cord of claim 9, wherein the signaling pattern comprises continuously receiving the signaling detection signal for a first length of time.

11. The electric cord of claim 9, wherein the signaling pattern comprises intermittently receiving the signaling detection signal a first number of times within a first length of time.

12. The electric cord of claim 6, wherein the controller is further configured to refrain from controlling the motor to rotate in the spooling direction when the second switch is closed.

13. The electric cord of claim 4, wherein the signaling detector comprises:
- a light emitting diode in series with the signal wire; and
- a photodetector electrically coupled to the controller and configured to provide the signaling detection signal to the controller when the photodetector detects light emitted from the light emitting diode.

14. The electric cord of claim 13, further comprising a current threshold circuit in parallel with the signaling detector, the current threshold circuit comprising:
- a second diode having a first and second end;
- a second resistor having a first and second end, the first end electrically coupled to a first end of the light emitting diode, the second end electrically coupled to the first end of the second diode; and
- a third resistor having a first and second end, the first end electrically coupled to a second end of the light emitting diode, the second end electrically coupled to the second end of the second diode.

15. The electric cord of claim 14, wherein the difference between a threshold voltage of the light emitting diode and a threshold voltage of the second diode is greater than the first current times the sum of the resistances of the second and third resistors.

16. The electric cord of claim 14, wherein the difference between a threshold voltage of the light emitting diode and a threshold voltage of the second diode is less than or equal to the second current times the sum of the resistances of the second and third resistors.

17. The electric cord of claim 3, wherein the continuity detector comprises:
- a light emitting diode in series with the signal wire; and
- a photodetector electrically coupled to the controller and configured to provide the continuity detection signal to the controller when the photodetector detects light emitted from the light emitting diode.

18. The electric cord of claim 1, further comprising a first resistor electrically coupling the signal wire and the neutral wire, in parallel with the first switch, and configured to allow a first current to flow from the signal wire to the neutral wire.

19. The electric cord of claim 18, wherein, when the first switch is closed, the signal wire and neutral wire are configured to carry a greater current than when the first switch is open.

20. The electric cord of claim 18, wherein the first resistor allows a controller to detect a continuity of the electrical cord.

21. The electric cord of claim 1, wherein the signal wire is configured to convey a signal to a controller from an end of the electrical cord.

* * * * *

UNITED STATES PATENT AND TRADEMARK OFFICE
CERTIFICATE OF CORRECTION

PATENT NO. : 8,995,099 B2
APPLICATION NO. : 13/566715
DATED : March 31, 2015
INVENTOR(S) : James B. A. Tracey et al.

It is certified that error appears in the above-identified patent and that said Letters Patent is hereby corrected as shown below:

IN THE SPECIFICATION

In column 7 at line 1, Change "MSP430F22321DA" to --MSP430F2232IDA--.

In column 8 at line 65, Change "docking"" to --docketing."--.

Signed and Sealed this
Twenty-ninth Day of December, 2015

Michelle K. Lee
*Director of the United States Patent and Trademark Office*